(12) United States Patent
Passamonte et al.

(10) Patent No.: US 11,986,694 B2
(45) Date of Patent: May 21, 2024

(54) SYSTEMS AND METHODS FOR SECURE, RELEASABLE MOUNTING OF MULTIPLE ITEMS

(71) Applicant: StackTrax LLC, Franklin, MA (US)

(72) Inventors: Anthony Passamonte, Franklin, MA (US); Lindsey Corak, Franklin, MA (US)

(73) Assignee: StackTrax LLC, Franklin, MA (US)

( * ) Notice: Subject to any disclaimer, the term of this patent is extended or adjusted under 35 U.S.C. 154(b) by 251 days.

(21) Appl. No.: 17/527,551

(22) Filed: Nov. 16, 2021

(65) Prior Publication Data

US 2022/0152447 A1    May 19, 2022

Related U.S. Application Data

(60) Provisional application No. 63/245,838, filed on Sep. 18, 2021, provisional application No. 63/114,900, filed on Nov. 17, 2020.

(51) Int. Cl.
*A63B 21/16* (2006.01)
*F16M 13/02* (2006.01)

(52) U.S. Cl.
CPC ........ *A63B 21/1681* (2013.01); *A63B 21/169* (2015.10); *F16M 13/022* (2013.01); *F16M 2200/04* (2013.01)

(58) Field of Classification Search
CPC .............. A63B 21/1681; A63B 21/169; A63B 23/1218; F16M 13/022; F16M 2200/04
USPC .................................................. 248/221.11
See application file for complete search history.

(56) References Cited

U.S. PATENT DOCUMENTS

| | | | |
|---|---|---|---|
| 3,638,981 A * | 2/1972 | Weider ...................... | F16B 7/22 403/376 |
| 5,626,546 A * | 5/1997 | Little .................. | A63B 21/4001 482/904 |
| 6,328,679 B1 | 12/2001 | Croft | |
| 7,896,786 B1 * | 3/2011 | Osbourne .......... | A63B 21/4019 482/141 |
| 2015/0352395 A1 * | 12/2015 | Gregory ............. | A63B 23/1218 482/123 |
| 2022/0034380 A1 * | 2/2022 | Scheffel ................. | F16M 13/02 |

(Continued)

OTHER PUBLICATIONS

WIPO/PCT International Search Report, Opinion, and Search Strategy for Appln: PCT US2159495 filed Nov. 16, 2021, ISA/US (14 pp.).

(Continued)

*Primary Examiner* — Muhammad Ijaz
(74) *Attorney, Agent, or Firm* — Maura K. Moran; Cambridge Technology Law LLC

(57) ABSTRACT

Systems and methods are disclosed for releasably securing items such as health, medical, fitness, and exercise equipment, in which anchor units are securely attachable directly or indirectly to a surface and are securely but releasably attachable to a plurality of items. The anchor unit may have a mounting base attachable to a surface, a fitting bracket that at one end may be permanently attachable or securely but releasably attachable to the mounting base, and an attachment subsystem for releasably, tightly, and securably attaching the mounting base to the fitting bracket. At its other end, the fitting bracket may be attachable to multiple items, or it may be permanently attachable to a selected item.

19 Claims, 21 Drawing Sheets

(56) References Cited

U.S. PATENT DOCUMENTS

2022/0040519 A1* 2/2022 Do ............... A63B 23/1236
2022/0152447 A1* 5/2022 Passamonte ....... A63B 23/1218

OTHER PUBLICATIONS

Cando Walslide Resistance Band Complete Exercise Station & Gym, online catalog of ScripHessco.com, downloaded Nov. 14, 2021, from https://www.scriphessco.com/products/cando-walslide-complete-exercise-station/?cat=309120&MENU=309120, accessed Sep. 5, 2021, 2 pp., ScripHessco, a division of Scrip Inc., Bolingbrook, IL. CANDO_Walslide_Resistance_Band_Complete_Exercise_Station.pdf.

Ideal Modular Exercise Stations, online catlog of tartangroup.com, downloaded Nov. 14, 2021, from https://www.tartangroup.com/ideal-modular-exercise-stations/, accessed Sep. 5, 2021, 2 pp., Tartan Group, Burr Ridge, IL. IDEAL_Modular_Exercise_Stations.pdf.

TheraBand CLX wall station, online catalog of theraband.com, downloaded Nov. 14, 2021, from https://www.theraband.com/products/resistance-bands-tubes/exercise-stations/theraband-clx-wall-station.html, accessed Sep. 5, 2021, 2 pp., Performance Health, Akron, IL. TheraBand_CLX_wall_station.pdf.

Snap-Loc E-Track System E-Track Singles, online catalog of snaploc.com, downloaded Nov. 14, 2021, from https://snaploc.com/collections/snaploc-e-track-singles, accessed before Nov. 17, 2020, 7 pp., Snap-Loc Cargo Control Systems, LLC, Las Vegas, NV. SNAP-LOC_E-Track_Singles.pdf.

Snap-Loc E-Track System E-Track Accessories, online catalog of snaploc.com, downloaded Nov. 14, 2021, https://snaploc.com/collections/snaploc-accessories , accessed Sep. 2, 2021, 6 pp., Snap-Loc Cargo Control Systems, LLC, Las Vegas, NV. SNAP-LOC_E-Track_Accessories.pdf.

Keller, Peter, What Is a Stringer and How Does It Help Me Install a Rig Into Studs?, uploaded Mar. 13, 2019 to https://www.fringesport.com/blogs/news/what-is-a-stringer-and-how-does-it-help-me-install-a-rig-into-studs, downloaded Nov. 14, 2021, from same, 5 pp. Fringe Sport, Austin TX. KELLER_What_Is_A_Stringer.pdf.

* cited by examiner

FIG. 1A
FIG. 1B
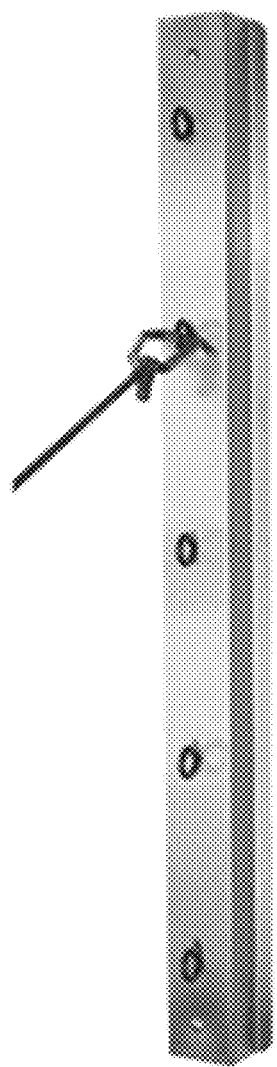

FIG. 7E
FIG. 7F
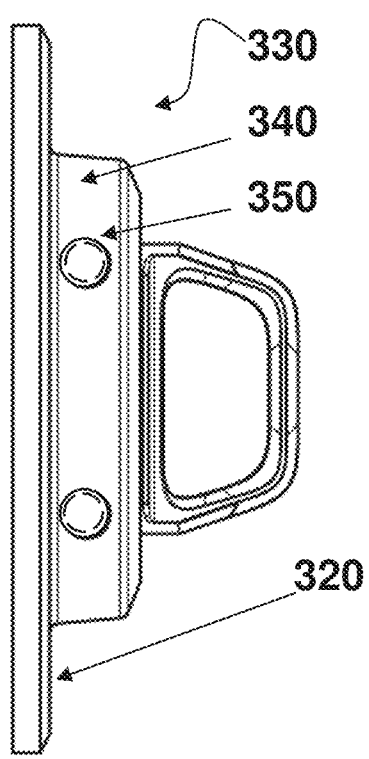
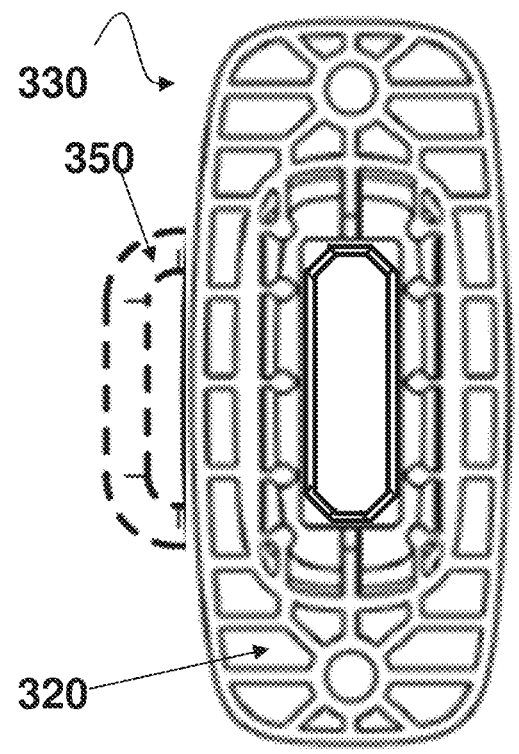

FIG. 9E
FIG. 9F
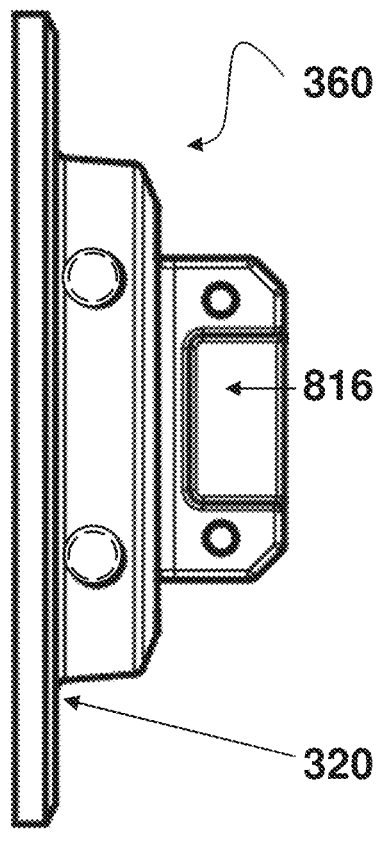
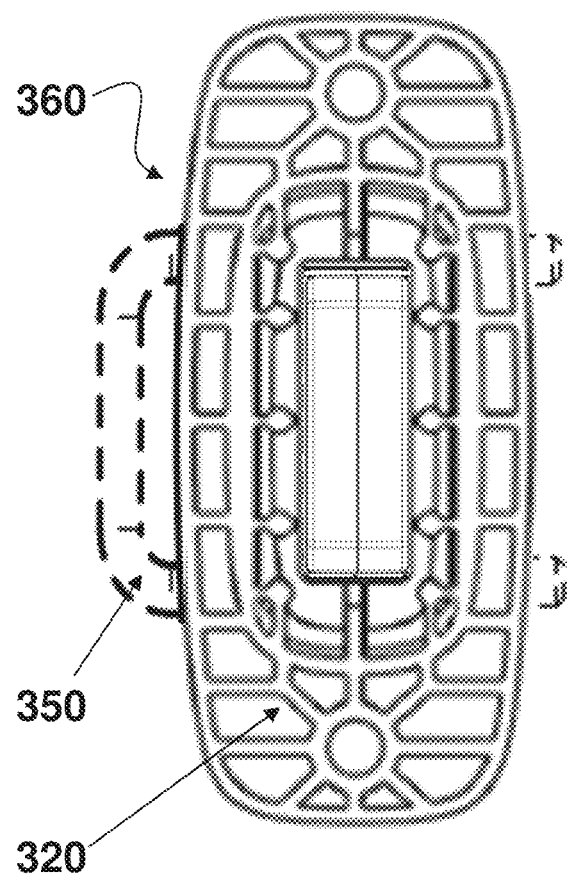

SYSTEMS AND METHODS FOR SECURE, RELEASABLE MOUNTING OF MULTIPLE ITEMS

CROSS-REFERENCE TO RELATED APPLICATION

This invention relates to the following applications, herein incorporated by reference and the filing dates of which Applicant claims the benefit at least in part:
U.S. Ser. No. 63/114,900, entitled "STACK TRAX"; (filed Nov. 17, 2020; Inventors: Anthony Passamonte, Lindsey Corak; Applicant: StackTrax LLC);
U.S. Ser. No. 63/245,838, entitled "SYSTEMS AND METHODS FOR SECURE, RELEASABLE MOUNTING OF MULTIPLE ITEMS" (filed on Sep. 18, 2021; Inventors: Anthony Passamonte, Lindsey Corak; Applicant: StackTrax LLC); and
U.S. Ser. No. 29/808,392, entitled SYSTEMS FOR SECURE, RELEASABLE MOUNTING OF MULTIPLE ITEMS, AND COMPONENTS THEREOF (filed Sep. 18, 2021; Inventors: Anthony Passamonte, Lindsey Corak; Applicant: StackTrax LLC).

FIELD

The present invention relates to the storage and mounting of systems with multiple items, such as systems of modular items, and particularly to the storage and secure, releasable mounting and anchoring of medical, fitness, and exercise equipment.

BACKGROUND

This invention relates to methods and systems which facilitate use of sets of items, such as modular items, and in particular, sets of health and fitness equipment.

In the health and fitness fields, equipment may be used during physical activity to enhance the strength or conditioning effects of that exercise by providing either fixed or adjustable amounts of resistance or weight, or to otherwise enhance the experience or outcome of an exercise routine. Such equipment may include devices or apparatuses that facilitate strength training, physical therapy, cardiovascular conditioning, stretching, yoga, core balance, massage therapy, and agility training; and may be found in commercial gyms, clubs, health centers, physical therapy clinics, rehab or fitness centers, hospitals, schools, exercise rooms in offices and hotels, and homes, and in use by chiropractic, physical therapy, massage, spa and home health professionals, and their clients, patients, member, and athletes. Exercise regimes may call for the use of several types of equipment, such as resistance bands and ropes, pull-up bars, dip bars, barbells, core and posterior chain toe locks, boxing bags, rope pulleys, and massage rollers.

A need has arisen for systems that can store and organize medical, fitness, and exercise equipment (also known as "medical, fitness, and exercise equipment" or "equipment") and allow for the equipment's releasable yet secure anchoring. In the past, a piece of equipment, also known as an "apparatus," has been provided with a mount to be used to securely anchor the equipment to a surface such as a wall. Conventional surface-mounted base systems include a Can-Do™ Walslide resistance band complete exercise station and gym shown in FIG. 1A, in which a rectangular-shaped wall piece is secured to a surface such as a wall. The wall piece may have snap hooks attached thereto that are arranged to slide seamlessly to any desired height up and down the center groove of the base, and to which resistance bands may be releasably secured. An optional top overhead pulldown piece may be attached to the wall piece, and be positioned at any height along the wall piece. The Can-Do™ Walslide Resistance Band Complete Exercise Station & Gym is available from ScripHessco, a division of Scrip, Inc. of Bolingbrook, IL, USA, and from the Tartan Group of Burr Ridge, IL, USA.

The Ideal Modular Exercise Station, shown in FIG. 1B, also available from the Tartan Group of Burr Ridge, IL, USA, has a series of mounting hooks arranged evenly on a rectangular-shaped base to releasably secure tubing and banding. The base is arranged to be mounted on a surface such as a wall, and the hooks are secured on the base in a vertical row to provide a user with options as to a selected height at which to secure the equipment.

The TheraBand CLX™ wall station, shown in FIGS. 1C-1, 1C-2, and available from the Performance Health of Akron, IL, USA, has an aluminum wall track arranged to be secured to a wall, CLX™ station anchors arranged to secure the track to the wall, and slide track connections arranged to securely slide in the track on one end and to be releasably secured to at its other end to a CLX consecutive loop (which is a strap designed to replace bands, loops, tubing with handles, and door anchors, with the strap formed of a double thickness of banding material that are joined together in several locations along the strap to form loops along the length of the strap).

Such systems may provide some flexibility to use of such equipment by allowing the equipment to be secured and then released from its wall mount so that other equipment may be used on the same base in its place (a space-saving advantage), so that the height of the use of the equipment may be adjusted to better suit the user (by moving equipment to a base secured at a more advantageous height), so that the equipment may be moved from location to location (a boon for users such as coaches, therapists, consultants, chiropractic, physical therapy, massage, spa, and home health professionals, athletes, clients, and patients, who may travel from location to location), and so that users may share the equipment (a cost-saving advantage).

Many of the wall station systems on the market do not allow for attachment of certain equipment, such as a pull up bar, which currently can only be attached by permanent bolts in the wall to ensure it is sufficiently strong, secure, and tight to withstand the pressures exerted thereon by a moving body. Currently, no wall station systems allow for releasable attachment that is tight and secure enough to ensure the safety of users across the entire range of activity required for a full course of exercise or therapeutic procedure. Further, current wall mounting systems are limited to a permanent attachment of one equipment accessory. For example, the Can-Do™ Walslide system is described (even in its name) as intended to be used with resistance bands. The Ideal Modular Exercise Station, is described as intended to be used with tubing and banding, and the TheraBand CLX™ wall station is described as intended to be used with CLX consecutive loops. There are no systems that allow for interchangeable equipment to be attached using the same fixed wall mount.

Current systems are fixed on the wall, such as wall fitness anchors, that has the designated uses of that system to attach accessories such as resistance bands, suspension trainers and straps, but do not have any additional uses other than as an anchoring component. As shown in FIG. 1D, conventional universal anchoring systems, such as the Snap-Loc E-Track System available from the Snap-Loc Cargo Control Systems, LLC of Las Vegas, NV USA, have also been used to mount medical, fitness and exercise equipment into a track on the surface. Such systems 30 have an anchoring base 31 with a projecting portion 34. The base 31 may be secured to a surface such as a wall or side of a vehicle with weld-on or screw-in anchors through screw or bolt holes 32, or they may be clicked to a track secured to the wall or other surface. A tie-down (not shown) may be inserted or clicked into an aperture 38 in the portion 34, and belts may be secured through the tie-down and used to secure cargo.

Conventional universal anchoring systems such as system 30 are ideal for cargo control. They are designed to control their loads without tight-fitting assemblies, as loose fittings help to adjust to asymmetries in the shapes of the loads, such as beams, protrusions, or other bends in parts of the loads. While they provide releasable mounting and height adjustment and the ability to design equipment as accessories to be mounted on a single base, their use to hold medical, fitness and exercise equipment may not hold the equipment as tightly and securely as is required for the safe use of the equipment. For example, excess space 36 provided between the outside surface of the anchor base and the inside surface of the track at the anchoring location (even as little as a total of about ⅛ of an inch, which would be the expected slack in the Snap-Loc E-Track System) may cause the anchor base to shift side to side. Accordingly, they are not ideal to securely hold medical, fitness and exercise equipment. Specifically, a person would not be able to safely use a pull-up bar on such systems due to the excess side to side movement of the bar within the track.

It would be desirable to provide an interchangeable anchor unit for securing multiple types of items, such as medical, fitness and exercise equipment, to save space and to reduce the number of stations needed to support the use of the items. Accordingly, it would be desirable for multiple types of items to be securely and releasably attachable to an interchangeable anchor unit.

Further, it would be desirable to securely attach a plurality of mounting bases to a surface such as a wall so that multiple types of items may be releasably and securely attached to the surface via the mounting bases and used at the same time. Still further, it would be desirable to securely attach interchangeable mounting bases to a surface such as a wall at varied heights so that a selected items, such as a piece of medical, fitness and exercise equipment, may be used at the vertical height that would allow for optimal use of the selected item based on the height of its user.

It would also be desirable to provide a surface mounting system that is securable to a surface such as a wall and is arranged to receive and securely hold several types of items thereon. It would also be desirable to provide a surface mounted medical, fitness, or exercise equipment system that has a less commercialized look and is a less invasive option for locations such as home, outdoor, ceiling, and small spaces, providing more versatility to where the system can be installed.

It would be desirable for a user to select an item, secure it to a surface-mounted base that is interchangeable to a plurality of types of items, and after, using the selected item, to release the selected item and secure another item to the surface-mounted base for use in performing another type of activity, or to move the selected item to another station to use the selected item in another location.

Further, it would be desirable for a user to securely attach the common base to a surface such as a wall so that multiple types of items may be releasably and securely attached to the surface via the base. Still further, it would be desirable for a user to have a plurality of options as to a selected height at which to secure the common base on the surface.

Finally, it would be desirable for consumers, fitness facility owners, health practitioners, physical therapists, and chiropractors to have access to a multitude of health, medical, and fitness accessories releasably securable to on one secure but releasable mounting system for a full training experience.

SUMMARY

A method is disclosed for securely but releasably attaching a plurality of items, such as health, medical, and fitness equipment accessories, to a surface such as a wall. In the disclosed method, a mounting base of an anchor unit may be securely attached directly or indirectly to a surface. A mounting base attachment fixture may be disposed on one end of a fitting bracket; and an item attachment fixture may be disposed to another end of the fitting bracket. The anchor unit may be formed by installing the fitting bracket into the mounting base with the mounting base attachment fixture inserted into an aperture in the mounting base.

The fitting bracket may be securely attached to the mounting base by applying a releasable connector to the installed fitting bracket/mounting base in a direction parallel to the floor and horizontally along a width of the installed fitting bracket/mounting base, and one or more items in a set of items may be attached to the item attachment fixture.

In further embodiments of the method, a first pair of pin holes may be disposed on a first side of the mounting base and a second pair of pin holes may be disposed on a second side of the mounting base. The first side may be parallel to the second side, and the first pair of pin holes may be arranged to be complementary in size and location to the second pair of pin holes. A first open channel may be disposed horizontally along a width of an upper portion of a mounting base-facing surface of the fitting bracket; and a second open channel may be disposed horizontally along a width of a lower portion of the mounting base-facing surface of the fitting bracket, with the first open channel parallel to the second open channel.

Installing the fitting bracket into the mounting base forms parallel open conduits in the anchor unit, with the conduits extending horizontally along the width of the mounting base, with sides of the conduits defined by the first open channel, the second open channel, and horizontal open channels in the fitting bracket-facing surface in the mounting base, and with openings of the conduits defined by the first set of pin holes and the second set of pin holes. Legs of a locking U-pin may be passed through the conduits to lock the mounting base attachment fixture to the mounting base.

An item mounting system with a plurality of anchor units is also disclosed herein for executing the methods described above, in which a first anchor unit is securely attachable directly or indirectly to a surface such as a wall and is securely but releasably attachable to a plurality of items.

The anchor unit may have a mounting base that is arranged to be securely attachable directly or indirectly to a surface such as a wall, and a fitting bracket that at one end may be securely but releasably attachable to the mounting base and at its other end may be securely but releasably attachable to a plurality of items. In certain embodiments, the fitting bracket may have a securing fixture to which the plurality of items are releasably attachable; in other embodiments, the fitting bracket may be permanently attachable to a selected item.

In certain embodiments, the items may have a plurality of attachment types, and the fitting brackets may have a plurality of securing types so that the items are releasably attachable to at least one of the fitting brackets, with a selected fitting bracket associated with at least one attachment type of the items.

In certain other embodiments, the item mounting system may have a single securing type of fitting bracket to which the items are releasably attachable.

In certain embodiments, the fitting brackets may have a plurality of brackets-securing types to secure the fitting brackets to the mounting base; in further embodiments, the mounting bases may have a plurality of mount-securing types so that the fitting brackets are releasably attachable to at least one of the mounting bases, with a selected fitting bracket associated with at least one mount-securing type of the mounting bases. In certain other embodiments, the system may have a single type of mounting base to which the fitting brackets are releasably securable. In certain embodiments, one or more fitting brackets may be releasably securable to one or more mounting bases at the same time. Further, in certain embodiments, the item mounting system may have a plurality of mounting bases that are vertically or horizontally disposed on the wall, and a plurality of fitting brackets may be releasably securable to one or more mounting bases.

In certain embodiments, the fitting brackets may have a short frame type so that a first anchor unit to which a short frame type fitting bracket is attached (which may be known as a short frame anchor unit) has a small horizontal profile extending from the wall, resulting in an item releasably secured to the short frame anchor unit being secured close to the wall.

In further embodiments, the fitting brackets may have an extended frame type so that a second anchor unit to which an extended frame type fitting bracket is attached (which may be known as a frame extender anchor unit) may have a wide horizontal profile extending from the wall, resulting in an item releasably secured to the frame extender anchor unit being secured a selected distance from the wall, allowing a user to use the item spaced from the wall.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiment(s) of the invention and together with the description, serve to explain the principles of the invention.

BRIEF DESCRIPTION OF THE DRAWINGS

FIGS. 1A-1D illustrate conventional equipment mounting systems, with:
FIG. 1A is a front perspective view of a first conventional equipment mounting system,
FIG. 1B is a front perspective view of a second conventional equipment mounting system,
FIG. 1C-1 is a front perspective view of a third conventional equipment mounting system,
FIG. 1C-2 is a more detailed front perspective view of a slide track connection for the third conventional equipment mounting system,
and
FIG. 1D is a front elevation view of a fourth conventional universal anchoring system;
FIGS. 3A-3C illustrate an alternative embodiment of a universal equipment mounting system 300, in which assembled anchor units 310 are formed with a fitting bracket 380 releasably attachable to a mounting base 320 secured to a wall, with:
FIG. 3A being a front perspective view of the system 300 with anchor units 310 holding equipment accessories 50, the anchor units formed of fitting bracket 380 and a mounting base 320,
FIG. 3B being a partially exploded front perspective view of a short frame anchor unit 330 (a type of anchor unit 310), which is formed with a short frame type fitting bracket 340 (a type of fitting bracket 380), a U-pin 350, and the mounting base 320, and
FIG. 3C being a front perspective view of a fully assembled frame extender anchor unit 360 (a type of anchor unit 310), formed from an extended frame type fitting bracket 370 (a type of fitting bracket 380), a U-pin 350, and the mounting base 320;
FIGS. 4A-4E illustrate the mounting base 320 shown in FIGS. 3B, 3C, with:
FIG. 4A being a top plan view thereof (the bottom plan view being a mirror image of the top),
FIG. 4B being a front perspective view thereof,
FIG. 4C being a front elevation view thereof, and
FIG. 4D being a right side view thereof (with the left side elevational view being a mirror image of the right side), and
FIG. 4E being a rear elevational view thereof;
FIGS. 5A-5E illustrate the short frame type fitting bracket 340 shown in FIG. 3B, with:
FIG. 5A being a top plan view thereof (the bottom plan view being a mirror image of the top),
FIG. 5B being a right side perspective view thereof,
FIG. 5C being a right side elevation view thereof (the left side elevational view being a mirror image of the right side),
FIG. 5D being a front elevation view thereof, and
FIG. 5E being a rear elevation view thereof;
FIGS. 6A-6D illustrate the U-pin 350 shown in FIGS. 3B, 3C, with:
FIG. 6A being a front elevation view thereof,
FIG. 6B being a right side elevation view thereof (the left side elevational view being a mirror image of the right side),
FIG. 6C being a top plan view thereof, and
FIG. 6D being a front perspective view thereof;
FIGS. 7A-7F illustrate an assembled short frame anchor unit 330 with the short frame type fitting bracket 340 releasably attached by the U-pin 350 to the mounting base 320, and with:
FIG. 7A being a top plan view thereof (the bottom plan view being a mirror image of the top),
FIG. 7B being a right side perspective view thereof,
FIG. 7C being a front elevation view thereof, and FIG. 7D being a right side elevation view thereof,
FIG. 7E being a left side elevation view thereof, and
FIG. 7F being a rear elevation view thereof;

FIGS. 8A-8E illustrate an attachment portion 870 of the partially assembled extended frame type fitting bracket 370, the attachment portion 870 ready for attachment to the frame extender 1070 (shown in FIGS. 10A-10F) to form the extended frame type fitting bracket 370 shown in FIG. 3C, with:

FIG. 8A being a top plan view thereof (the bottom plan view being a mirror image of the top),
FIG. 8B being a right perspective view thereof,
FIG. 8C being a right side elevation view thereof (the left side elevational view being a mirror image of the right side),
FIG. 8D being a rear elevation view thereof, and
FIG. 8E being a front elevation view thereof;

FIGS. 9A-9F illustrate a partially assembled frame extender anchor unit 360 with the attachment portion 870 releasably secured by the U-pin 350 to the mounting base 320, the partially assembled frame extender anchor unit 360 ready for attachment to the frame extender 1080 to form a fully assembled frame extender anchor unit 360, and with:

FIG. 9A being a front elevation view thereof,
FIG. 9B being a right side elevation view thereof,
FIG. 9C being a top plan view thereof (the bottom plan view being a mirror image of the top),
FIG. 9D being a front perspective view thereof,
FIG. 9E being a left side elevation view thereof, and
FIG. 9F being a rear elevation view thereof;

FIGS. 10A-10F illustrate a partially assembled extended frame type fitting bracket 370, with the attachment portion 870 riveted to the frame extender 880, the partially assembled extended frame type fitting bracket 370 ready for releasable attachment to the mounting base 320 to form the frame extender anchor unit 360 that is fully assembled except for the addition of a conventional handle 90, and with:

FIG. 10A being a top plan view thereof,
FIG. 10B being a bottom plan view thereof,
FIG. 10C being a right side perspective view thereof,
FIG. 10D being a front elevation view thereof,
FIG. 10E being a right side elevation view thereof (the left side elevation view being a mirror image of the right side), and
FIG. 10F being a rear elevation view thereof;

FIGS. 11A-11D illustrate a conventional handle 90 for attachment to the partially assembled extended frame type fitting bracket 370 of FIGS. 10A-10F, and with:

FIG. 11A being a top plan view thereof,
FIG. 11B being a right side perspective view thereof,
FIG. 11C being a right side elevation view thereof, and
FIG. 11D being a front elevation view thereof;

FIGS. 12A-12F illustrate an assembled extended frame type fitting bracket 370 with an assembled pull-up bar attached thereto, the pull-up bars formed with handles 90s, and with:

FIG. 12A being a top plan view of the assembled extended frame type fitting bracket 370,
FIG. 12B being a bottom plan view thereof,
FIG. 12C being a front perspective view thereof,
FIG. 12D being a right side elevation view thereof (the left side elevation view being a mirror image of the right side),
FIG. 12E being a front elevation view thereof, and
FIG. 12F being a rear elevation view thereof;

FIGS. 14A, 14B are front perspective views of medical, fitness, and exercise equipment mounting systems 1400a, 1400b, with:

FIG. 14A showing mounting bases 1412, 1414, 1416, 1418 disposed on a stringer board 1405a secured vertically to the wall, with the stringer screwed in multiple locations along a single wall stud, and FIG. 14B showing a stringer board 1405b ready for mounting bases (not shown) to be disposed thereon, with the stringer board secured horizontally to the wall across two or more studs, the stringer board screwed onto at least two wall studs, and the stringer board screwed in multiple locations on multiple studs.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

The following detailed description addresses methods and systems for storing and secure, releasable mounting of health, medical, fitness, and exercise equipment. However, it is to be understood that such systems and methods are not limited to storing and mounting health, medical, fitness, and exercise equipment. Such systems and methods are useful in managing any systems with multiple items, in particular any systems of modular items, and they are useful in any environment in which items or other equipment, such as craft supplies or tools, are shared, particularly in factories, theaters, gyms, hospitals, and craft or framing centers.

Figures 1, 1C:
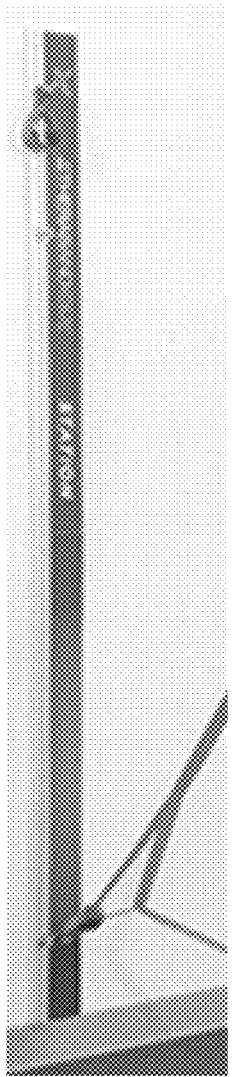
Figures 1, 1C, 2:
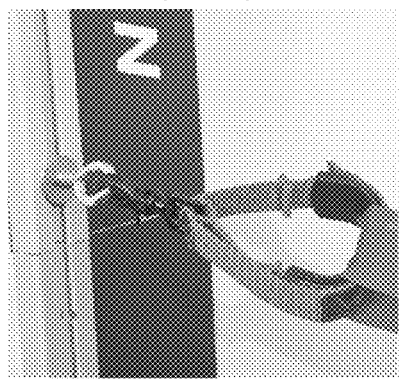
Figure 1D:
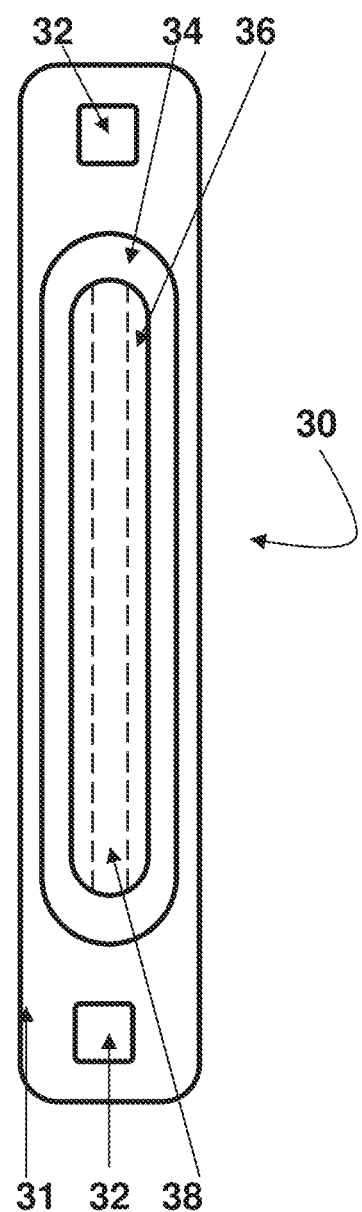
Figure 2A:
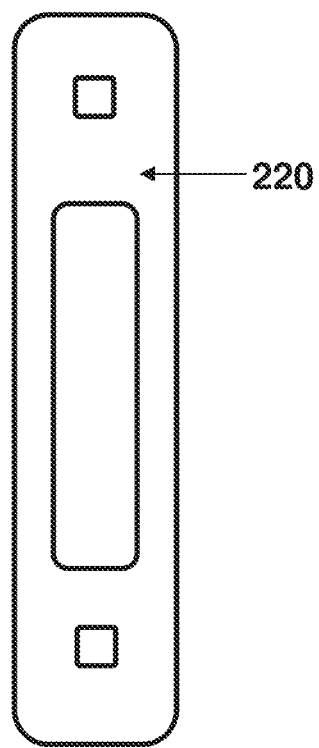
FIGS. 2A-2C illustrate an anchor unit 210 in an illustrative but not necessarily preferred embodiment of an equipment mounting system 200 of the current invention, with"
FIG. 2A being a front elevation view of a mounting base 220 for the anchor unit 210,
FIG. 2B being a rear elevation view thereof, and
FIG. 2C being a right side elevation view of the assembled anchor unit, in which a fitting bracket is releasably attached to the mounting base shown in FIGS. 2A, 2B, with a conventional pull-back spring lever.
Figure 2B:
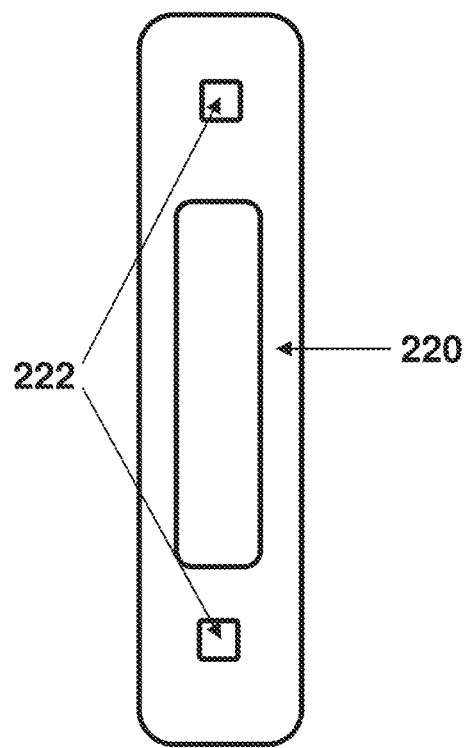
Figure 2C:
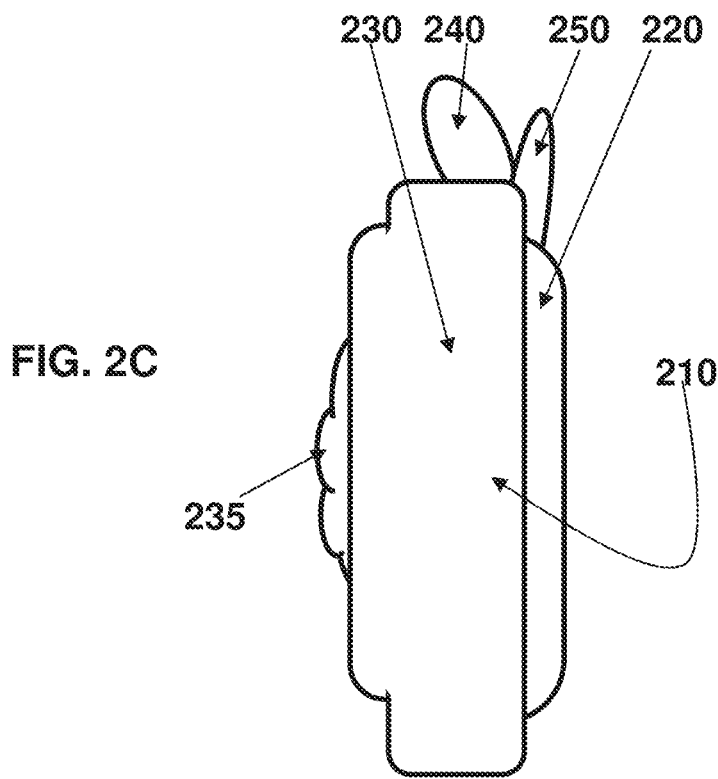

Referring to FIGS. 2A-2C, a first embodiment for a health, medical, fitness, and exercise equipment mounting system 200 with a plurality of anchor units 210 formed from a mounting base 220 that is securely attachable directly or indirectly to a surface such as a wall; and a fitting bracket 230 that is securely but releasably attachable to a plurality of health, medical, and fitness equipment accessories and that is securely but releasably attachable to the mounting base 220. As shown in FIG. 2C, the fitting bracket 230 has attached to one end an attachment element 235, such as a ring, loop, or other closed shape, to which equipment accessories may be releasably attached, at its other end is releasably attachable to the mounting base 220 with a latching spring 250 such as a conventional pull-back spring lever.

The mounting base 220 may have a pair of lag bolt holes 222 sized to receive a pair of lag bolts for screwing the mount base to the wall. Typically, lag bolts are heavy-duty bolts with a hex head and with threads that grip the medium when a hole has first been drilled. The tapered point or gimlet point of the bolt helps pull the bolt into the hole and secure its threads. Lag bolts are often used to ensuring structural securing of parts, so they may be much thicker than regular wood screws.

The mounting base 220 may be formed of stamped metal and may have a layer of thickness applied thereto to create a "winged" latching spring 250. The aperture for receiving the fitting bracket 230 is sized to provide a tight, snug fit between the mounting base 220 and the fitting bracket 230, and to minimize any rattle and movement of the fitting bracket 230 against the mounting base 220 when the fitting bracket 230 is secured to the base.

When the fitting bracket 230 is clicked into a mounting base 220 that is secured to the wall, a durable, sturdy, and secured anchor unit 210 is created; an equipment accessory may then be attached by a locking element, such as a carabiner or other releasable connector, to the attachment element 235, and put to exercise or therapeutic use by a patient or client. When the activity is completed, the equipment accessory may be detached and another piece of equipment put into place.

Figure 3A:
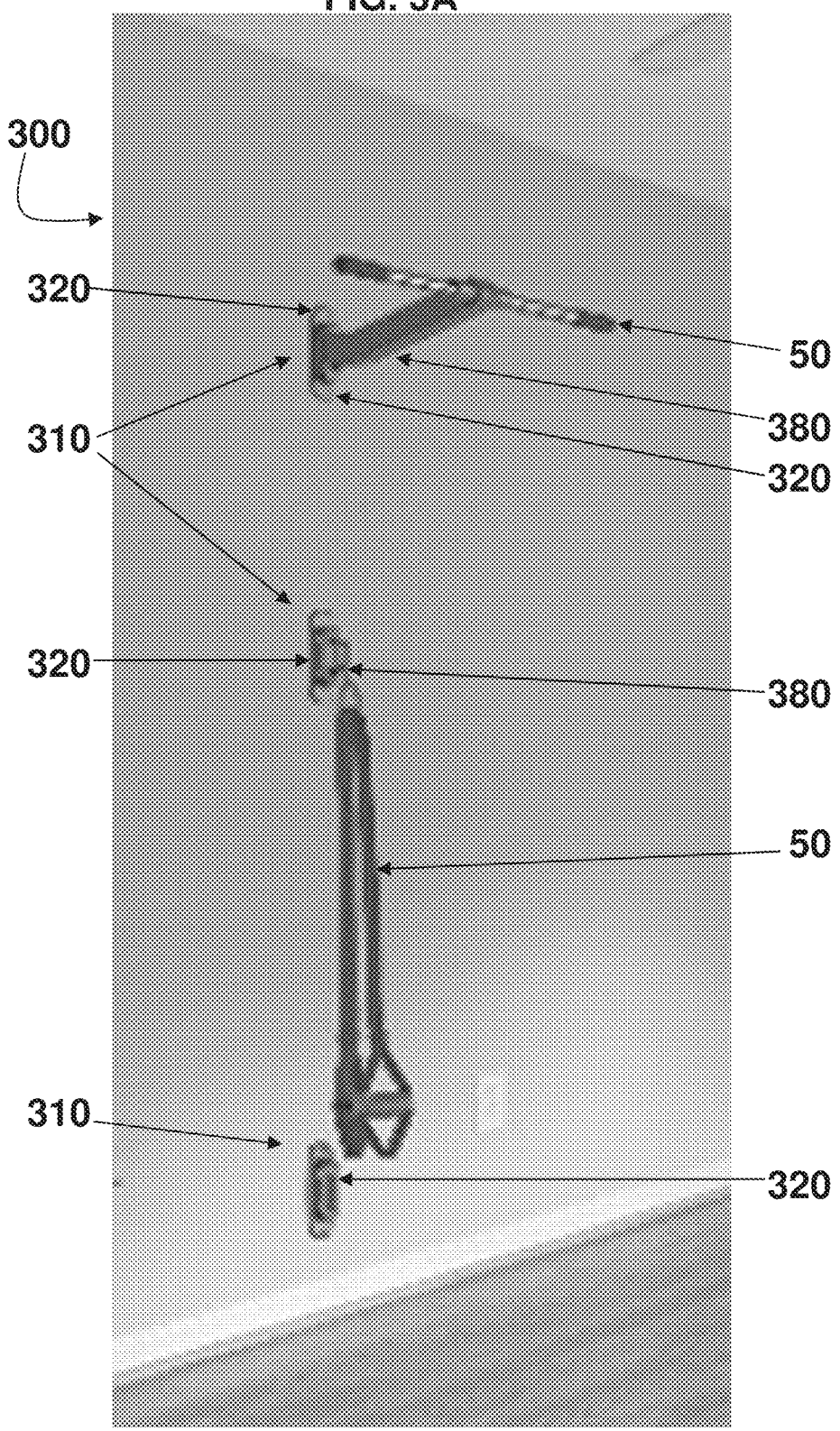
Figure 3B:
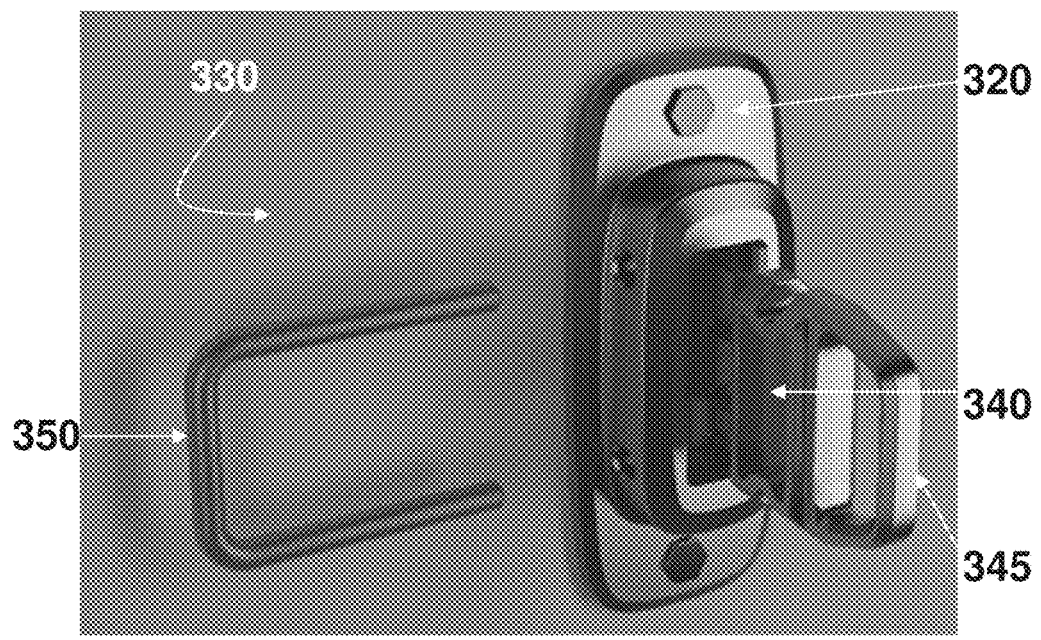

Referring to FIGS. 3A, 3B, a second embodiment for a health, medical, fitness, and exercise equipment mounting system 300 has a plurality of anchor units 310 formed from a fitting bracket 312 that is securely but releasably attachable at one end to a plurality of health, medical, and fitness equipment accessories and that is securely but releasably attachable by a locking U-pin 350 at its other end to a mounting base 320 that itself is securely attachable directly or indirectly to a surface such as a wall.

As shown in FIG. 3A, the anchor unit 310 may be a short frame anchor unit 330 (as discussed in further detail below) that may be formed with a die-cast alloy, which has at one end an attachment element 345, such as a ring, loop, or other closed shape, to which equipment accessories may be attached and at its other end a releasably attachable with a U-pin 350 to the mounting base 320.

The mounting base 320, a fully tooled and assembled piece that is secured to flat surface for releasably receiving and securing equipment is shown in FIGS. 4A-4E. The mounting base 320 may have a pair of lag bolt holes 322 sized to receive a pair of lag bolts for screwing the mounting base to the wall. As shown in FIGS. 4A-4E, the mounting base 320 is a generally rectangular piece 410 of a die-cast alloy, that has a raised inner box 420 central to the piece 410 and that extends outward from the piece 410. The box 420 is open at its front and rear and has a pair of pin holes 422 positioned on the sides 426 of the box 420 and sized to receive the U-pin therethrough. The inside surface 428 of the box sides 426 may have horizontally disposed ribs 424 disposed above and between the pin holes 422 and sized to guide the U-pin 350 across the interior of the box 420.

Figure 4A:
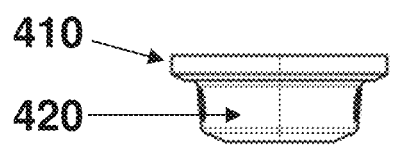
Figure 4B:
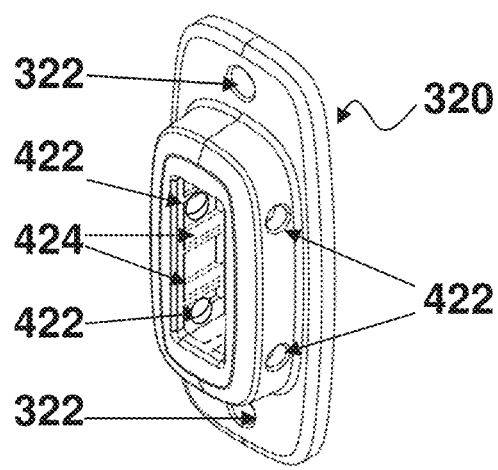
Figure 4C:
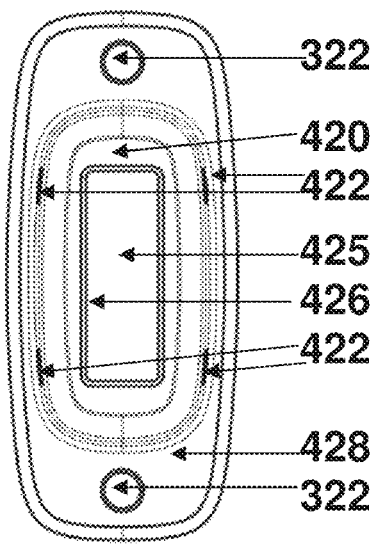
Figure 4D:
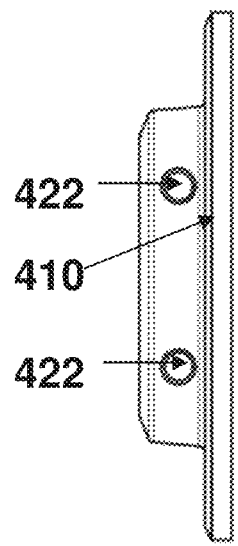
Figure 4E:
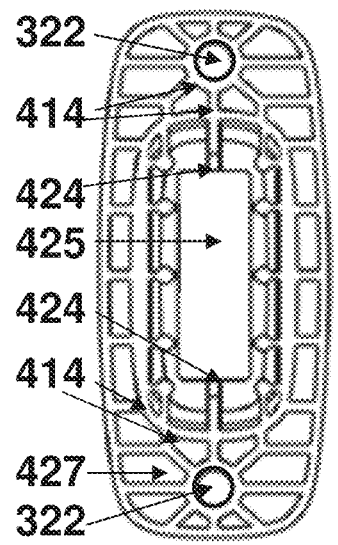
Figure 5A:
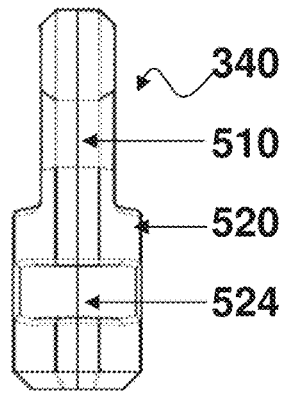
Figure 5B:
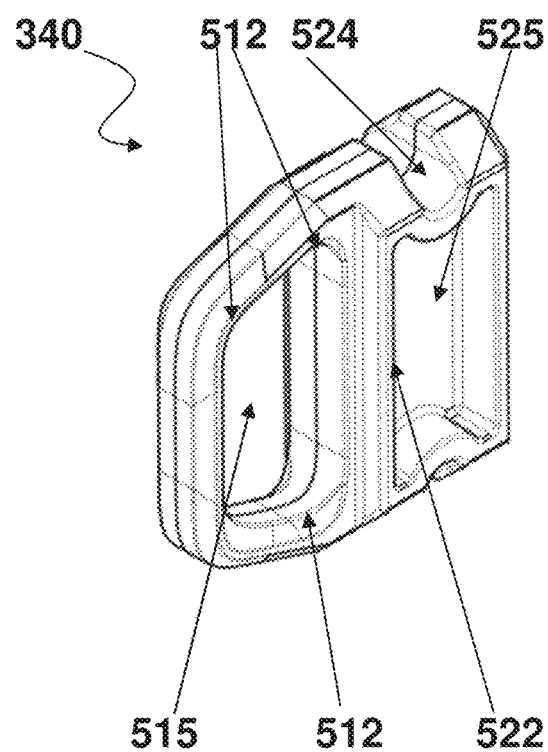
Figure 5C:
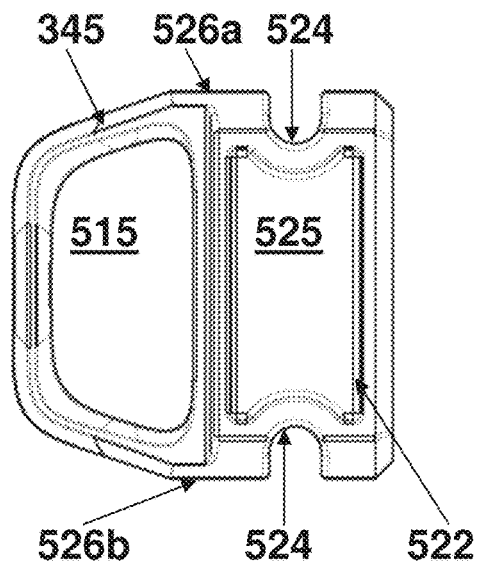
Figure 5D:
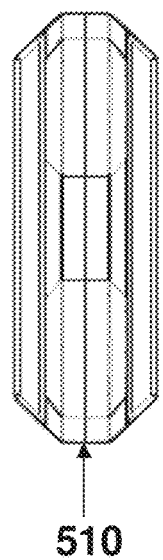
Figure 5E:
Figure 6A:
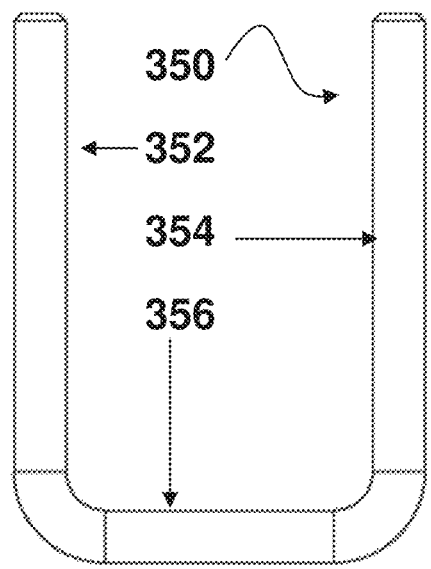
Figure 6B:
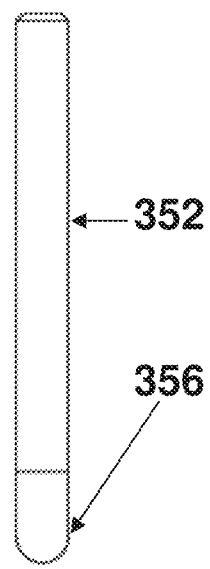
Figure 6C:
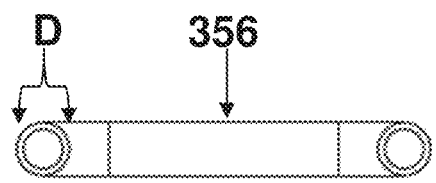
Figure 6D:
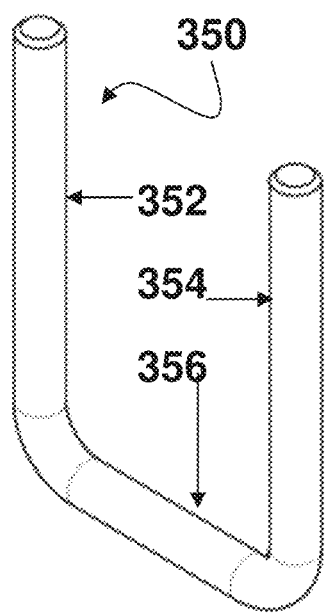
Figure 7A:
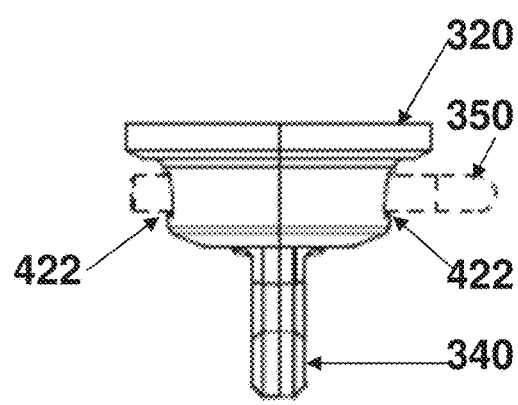
Figure 7B:
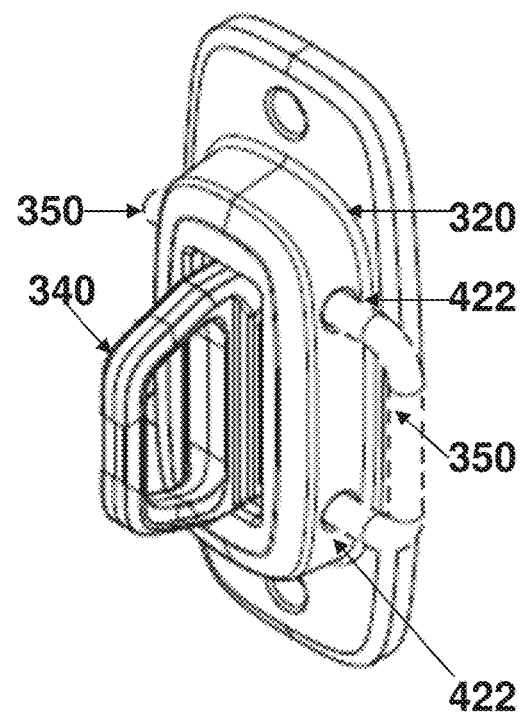
Figure 7C:
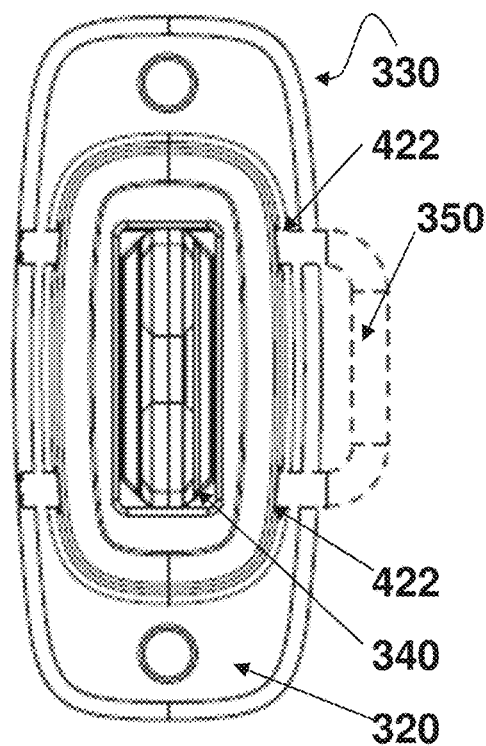
Figure 7D:
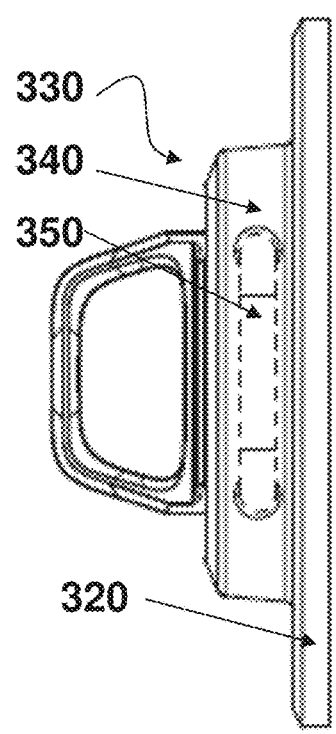

Further, as particularly shown in FIG. 4E, the rear surface 412 of the piece 410 has an additional grid of horizontally, diagonally, and vertically disposed ribs 414 (and also radiating from the lag bolt holes 322) that may be formed of a die cast alloy and disposed across the rear 427 of the piece 410 and sized to stiffen the piece 410. The ribs 414, 424 act to retain the U-pin 350 across the interior of the box 420, to secure all fitting brackets into a locked position, to reduce torque on the lag bolts or other tightening mechanism, to stiffen the base, to distribute the forces exerted by the physical activity performed on the equipment, and to add adherence between the wall and the base 320 when the base Is screwed to the wall. The ribs 414, 424 may be of any convenient design on the rear 427, chosen at the option of the designer. For example, they may be arranged in a horizontal/vertical grid, or in a diagonal grid across the rear. In the embodiment shown in FIG. 4E, the ribs 414, 424 are arranged in an aesthetically pleasing design.

The short frame type fitting bracket 340, a fully tooled and assembled piece that is releasably secured to the base 320, is shown in FIGS. 5A-5E. As shown in FIGS. 5A-5E, the short frame type fitting bracket 340 is a generally rectangular base-securing section 520 that may be formed of a die cast alloy and an equipment-receiving section 510 with an attachment aperture 515 edged with a frame 512 that provides additional structural support to the equipment-receiving section 510 and the loop 345 around which equipment accessories may be attached.

In certain embodiments, the central section of the base-securing section of the short frame type fitting bracket 340 may be a solid. In other embodiments, such as the short frame type fitting bracket 340 shown in more detail in FIGS. 5A-5E, the base-securing section 520 may have an aperture 525 central to the base-securing section 520 and that extends through the base-securing section 520. The aperture 525 may be edged by a frame 522 that provides additional structural support to the bracket 340. Further, the base-securing section 520 may have a pair of channels 524 positioned on the top 526a and bottom 526b of the base-securing section 520 and sized to guide the U-pin when it is extended thereacross.

As shown in FIGS. 6A-6D, the locking U-pin 350 (also known as a U-pin) is a tooled piece bent of high carbon steel into a U shape, with generally parallel legs 352, 354 integral with a central rod 356 that extends generally perpendicular to the U-pin legs 352, 354. The U-pin 350 is sized to have a thickness diameter D that is selected to provide a thickness of metal for imparting a strength sufficient to connect the mounting base 320 with the fitting bracket 310 and to withstand the pressures exerted on the anchor unit 310 by a user in his or her use of any of the equipment accessory that are allowable for use in the system in accordance with the specifications defined by the developer of the system 300.

The short frame anchor unit 330 may be assembled by fitting the short frame type fitting bracket 340 through the aperture 425 in the mounting base 320 from the front 428 of the face of the mounting base 320, inserting the legs 352, 354 of the U-pin 350 through the pin holes 422 on one side of the mounting base 320, and through the parallel conduits defined by the channels 524 on the sides of the short frame type fitting bracket 340 (see FIGS. 5C, 5D) and the ribs 424 on either side of the pin holes 422 (see FIGS. 4B, 4E), and then through the pin holes 422 on the other side of the mounting base 320. The short frame anchor unit 330 in full assemble is shown in FIGS. 7A-7F.

It may be seen that the releasing connection shown in FIGS. 2A-2C is made secure by providing a tight fit between the mounting base 220 and the fitting bracket 230 in the system 200 in which the releasable connector is disposed horizontally along the width of the mounting base and parallel to the floor. The tight fit of the mounting base 220 and the fitting bracket 230, reduces the vulnerability of the connection to being jiggled out of securement. The releasing connection of FIGS. 3A-7F, while also providing a tight fit between the mounting base 320 and the fitting brackets 340, 370, is made even more secure by use of a releasable connector that is disposed vertically along the length of the mounting base and orthogonal to the floor. The releasable connection is thus positioned in a plane orthogonal to the plane in which many of the pressures are exerted by a moving body on an anchor unit during use of a selected equipment accessory.

For example, when an anchor unit 310 is mounted on a wall and an equipment accessory is attached thereto during use of the accessory, many of the pressures exerted on the anchor unit pull on the anchor unit in directions away from the surface upon which it is mounted. Therefore, while the anchor unit 210 has an attachment subsystem with a releasable connector that is disposed vertically along the length of the mounting base and orthogonal to the floor, the anchor unit 310 has a releasable connector that is disposed. horizontally along the width of the mounting base and parallel to the floor.

The connection for the anchor unit 310 (for example, the locking U-pin in the embodiment shown in FIGS. 3A-7F), is applied parallel to the surface upon which the anchor unit is mounted and perpendicular to many of the downward pressures exerted on the anchor unit during activity, so that the pressures exerted on the anchor unit 310 are distributed across the anchor unit during activity. Further, the connection is formed of strong metals. The disposition of the releasable connection across the surface but not in the direction of most of the pressures on the anchor unit means that the connection is not vulnerable to being jiggled out of securement by forces pulling away from the anchor unit.

Figure 3C:
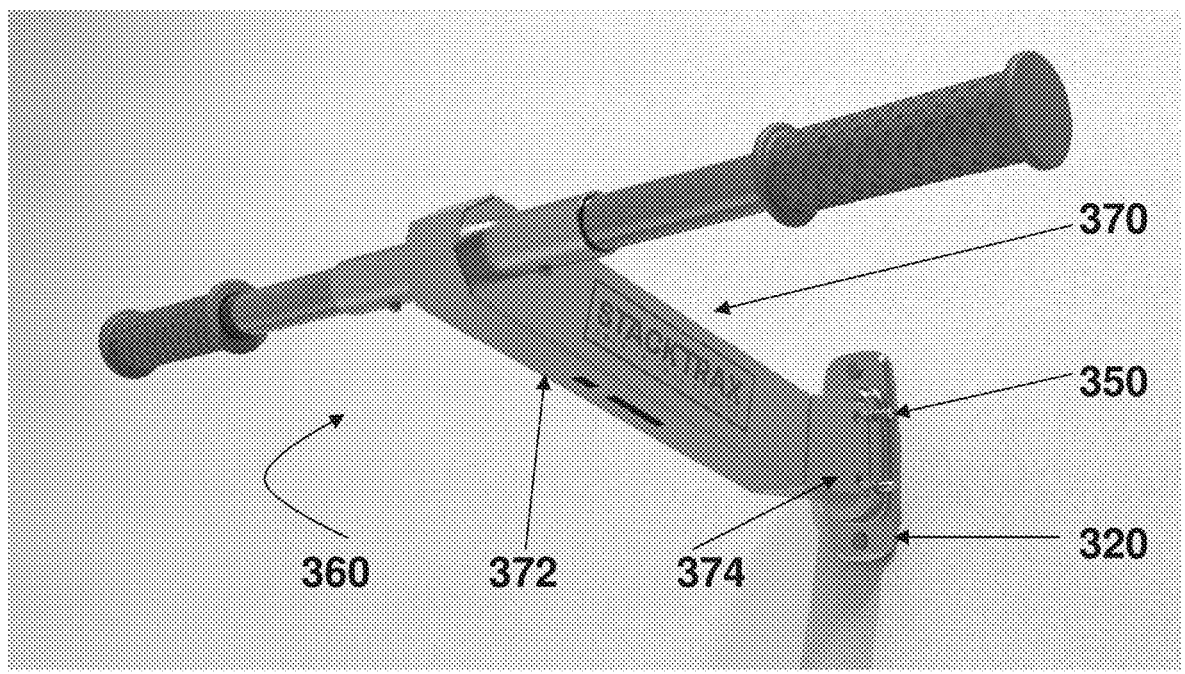

The anchor unit 310 may be a frame extender anchor unit 360 that is formed from a die-cast alloy. FIG. 3C, which shows an assembled frame extender mounting unit 360 with an extended frame type fitting bracket 370 releasably attached with the U-pin 350 to the mounting base 320.

The extended frame type fitting bracket 370 may have at one end a releasably attachable base attachment element 374 for connection to the mounting base 320 with a U-pin 350, and at its other end a frame extender 372 for connection of equipment accessories thereto. The base attachment element 374, which is shown in FIGS. 8A-8E with reference to FIGS. 9A-9F, may be integral with the frame extender 372, or the elements may be otherwise permanently joined. In the embodiment shown in FIG. 3B, the frame extender 372 may have at its free end a pull up bar, which may be permanently welded or riveted to the frame extender anchor unit 360. While not shown in the figures, the frame extender 372 may also have at its free end an attachment element, such as elements 235, 345, to which equipment accessories may be attached.

The base attachment element 374 for the extended frame type fitting bracket 370 is a fully tooled and assembled piece that may be formed from rectangular steel stock and that is releasably securable to the base 320. The base attachment element 374 may have at one end a generally rectangular extender-receiving box 810 may be formed of a die-cast alloy and at its other end a generally rectangular base-securing box 820 that also may be formed of a die-cast alloy. The extender-receiving box 810 may be integral with or permanently attached to the base-securing box 820.

Figure 8A:
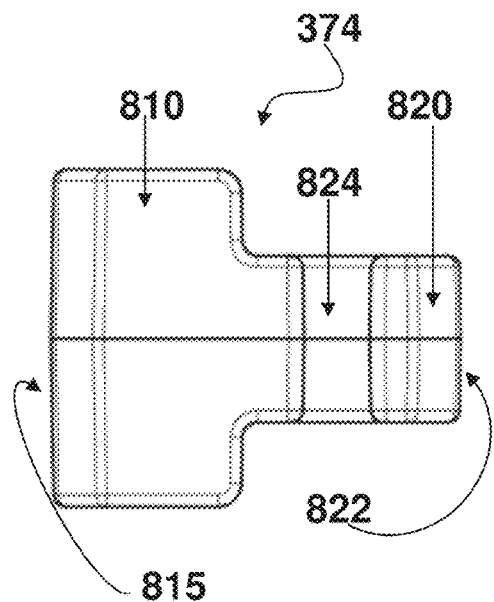
Figure 8B:
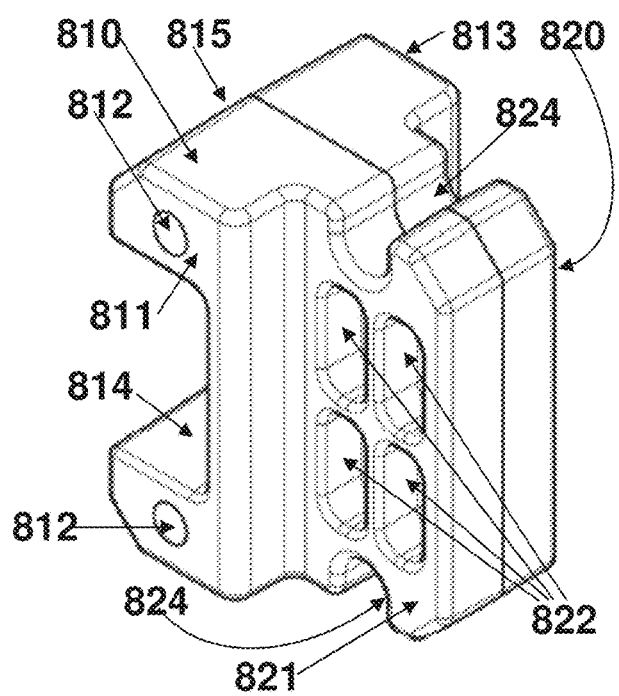
Figure 8C:
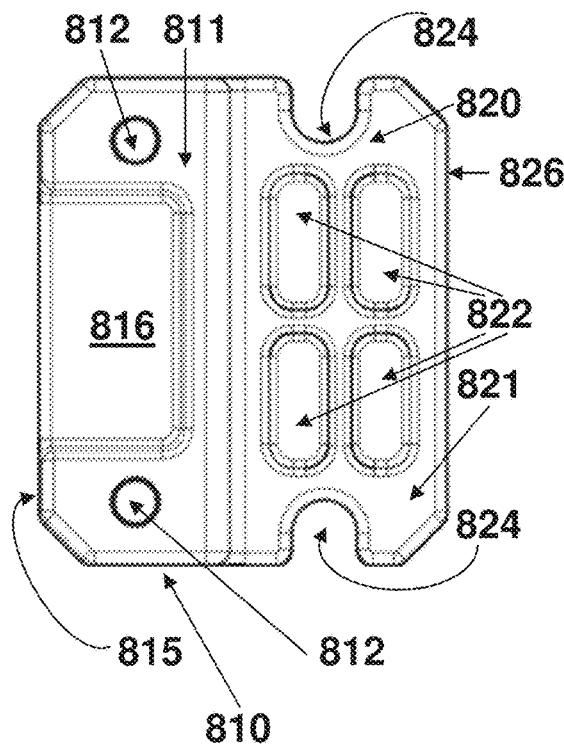
Figure 8D:
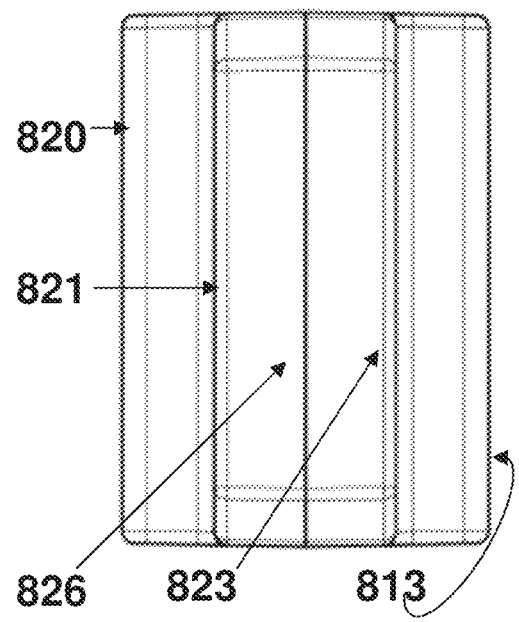
Figure 8E:
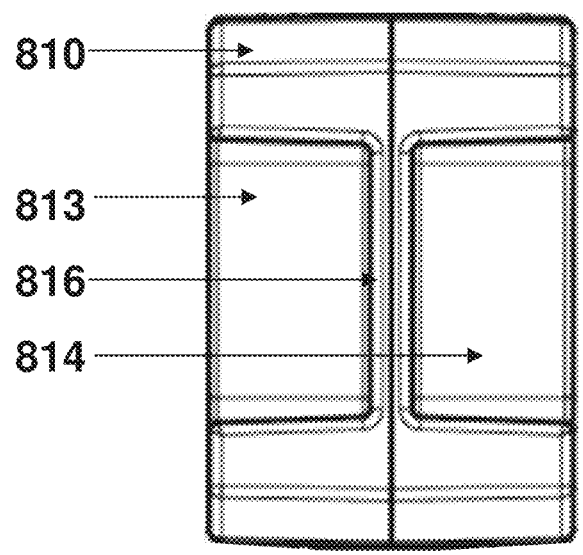
Figure 9A:
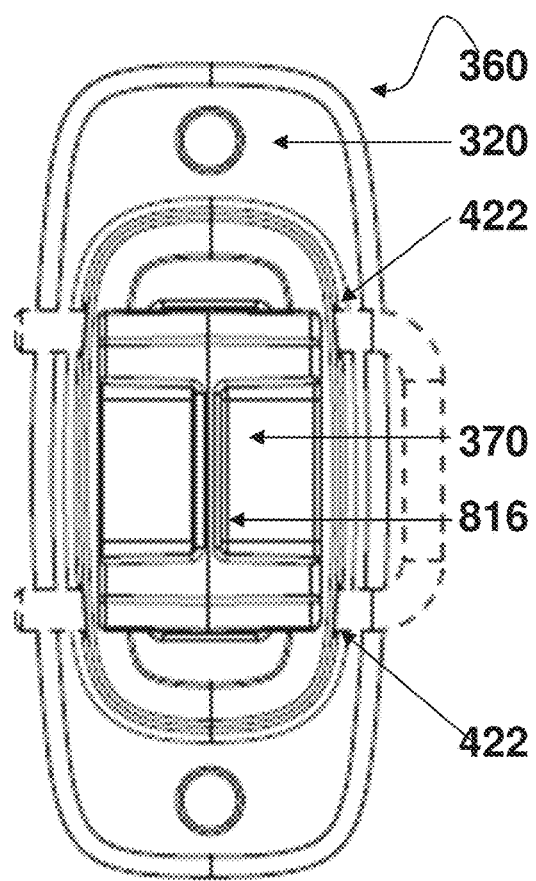
Figure 9B:
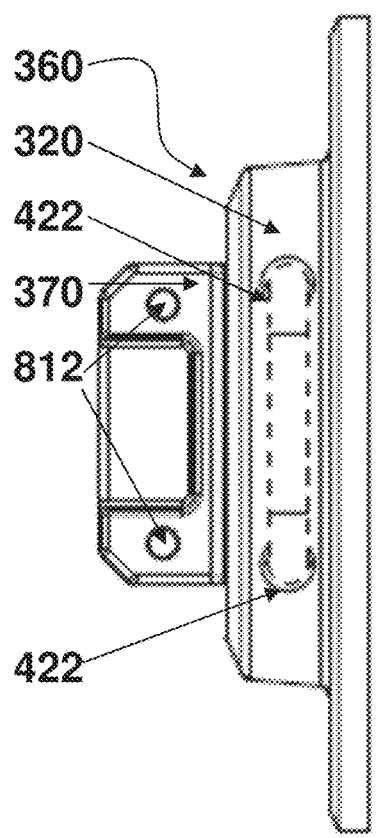
Figure 9C:
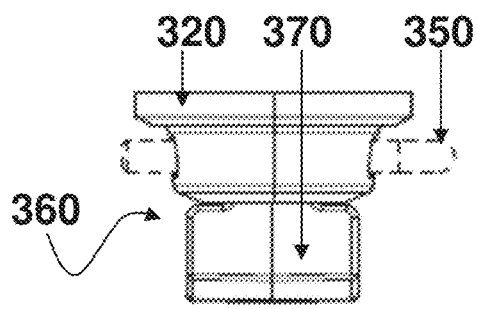
Figure 9D:
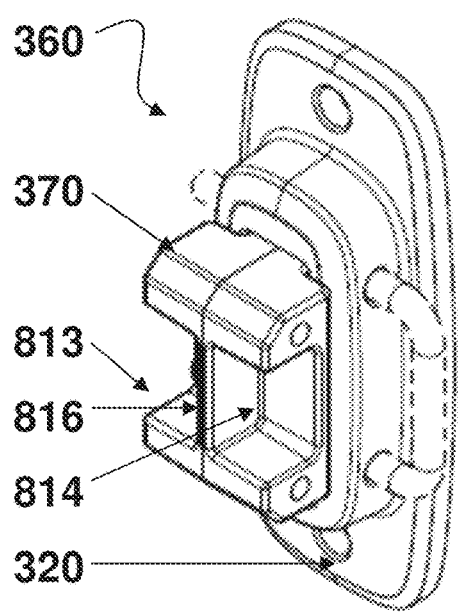

The extender-receiving box 810 may have connection sites 812 disposed on the faces of the box 810 for the purpose of connecting the base attachment element 374 to the frame extender 372. In FIGS. 8B, 8C, two connection sites 812 are shown to be disposed on the right face 811 and two connection sites 812 are shown to be disposed on the left face 813 of the box 810, but it is to be understood that the number and location of the connection sites 812 may be left to the discretion of the system designer.

In certain embodiments in which the base attachment element 374 is connected permanently to the frame extender 372, the connection sites 812 may be riveting or welding sites arranged with complementary sites 1012 to join through welding or riveting (or other secure joining method) the base attachment element 374 and the frame extender 372. In other embodiments in which the base attachment element 374 is releasably connectable to the frame extender 372, the frame extender 372 may be joinable to the base attachment element 374 at connection sites 812, 1012 using a connection system such as the locking U-pin described herein or through a conventional system. It may be noted that the positioning of the connection sites 812, 1012 on the left side and right sides, of the base attachment element 374 and the frame extender 372, respectively, allows the connection therebetween to be positioned in a plane orthogonal to the plane in which many of the pressures are exerted by the moving body on the anchor unit during use of a selected equipment accessory, thus ensuring the secure attachment of the base attachment element 374 and frame extender 372.

In certain embodiments, the extender-receiving box 810 may be a solid block. In other embodiments, such as the base attachment element 374 shown in more detail in FIGS. 8B, 8C, 9A, 9D, the extender-receiving box 810 may have generally rectangular recesses or cut-outs 814 in its left face 813 and its right face 811 that extend from the front face 815 of the extender-receiving box 810 toward the base-securing box 820, optionally with a central wall 816 extending between the recesses 814. The cut-outs may be formed in the front face 815 of the extender-receiving box 810 at the option of the system designer if the designer chooses to reduce cost and weight of the extender-receiving box 810 by eliminating additional material.

In certain other embodiments, the base-securing box 820 may be a solid block. In other embodiments, such as the base attachment element 374 shown in more detail in FIGS. 8B, 8C, the generally rectangular base-securing box 820 may have a series of attachment recesses 822 in its surfaces, with the recesses 822 optionally comprising apertures that extend through the base-securing box 820 from its face 823 to its opposite face 821. The recesses may be formed in one or both faces 821, 823; or they may extend from faces 821, 823 to form apertures at the option of the system designer if the designer chooses to reduce cost and weight of the base-securing box 820 by eliminating additional material.

As with the short frame type fitting bracket 340, the base-securing box 820 may have a pair of channels 824 positioned above and below the attachment apertures 822 and sized to guide and retain the U-pin 350 when it is extended thereacross so that the base attachment element 374 may be releasably attached to the mounting base 320.

The frame extender 372, as shown in FIGS. 10A-10F, may be formed from rectangular steel stock, and may have one end 1010 that is sized and arranged to connect to the base attachment element 374 to form the extended frame type fitting bracket 370. As noted above, the frame extender 372 may have connection sites 1012 disposed near the one end 1010 at which the frame extender 372 may be permanently attached (for example, by welding) to the base attachment element 374.

It is to be understood that the number and location of the connection sites 1012 may be left to the discretion of the system designer, with the connection sites 1012 complementary in shape and location to the connection sites 812 on the extender-receiving box 810. Further, the frame extender 372 optionally may have an elbow 1020 that causes the frame extender 372 to extend at an obtuse angle along its length, so that, as seen in FIG. 3C, the frame extender 372 may extend at the one end 1010 perpendicularly from the wall and parallel to the floor, and the frame extender 372 may extend between the elbow 1020 and its other end 1010 at a slight angle toward the ceiling.

The frame extender anchor unit 360 may assembled in a similar manner as the short frame anchor unit 330 is assembled, by fitting the base attachment element 374 through the aperture 425 in the mounting base 320 from the front face of the raised inner box 420, inserting the legs 352, 354 of the U-pin 350 through the pin holes 422 on one side of the mounting base 320, through parallel conduits defined by the channels 824 on the sides of the extended frame type fitting bracket 370 (see FIGS. 9A-9F) and the ribs 824 on either side of the pin holes 422 (see FIGS. 4B, 4E), and then through the pin holes 422 on the other side of the mounting base 320.

As noted above, an extended frame type fitting bracket 370 may have at its free end 1030 (the end that is opposite to the mounting base 320) an attachment element, such as elements 235, 345, to which equipment accessories may be releasably attached.

Figure 10A:
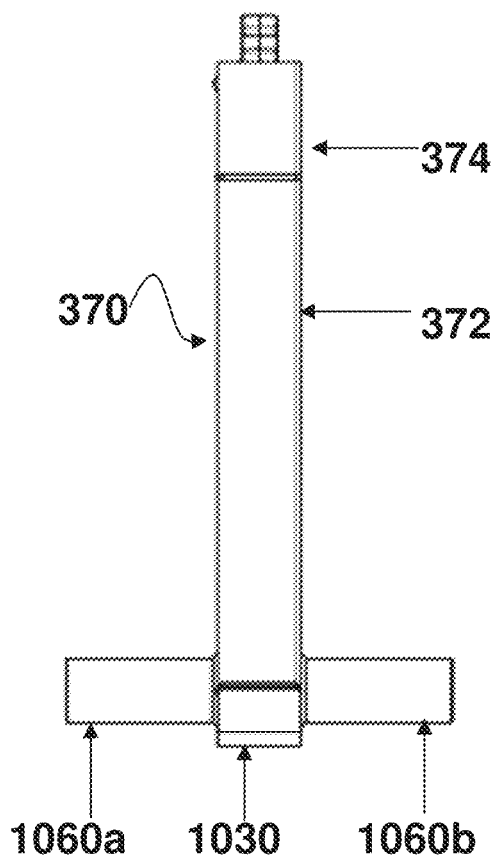
Figure 10B:
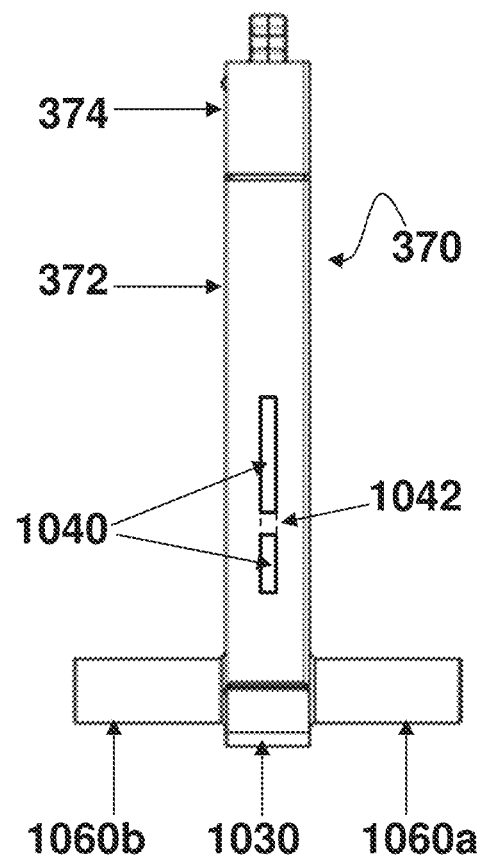
Figure 10C:
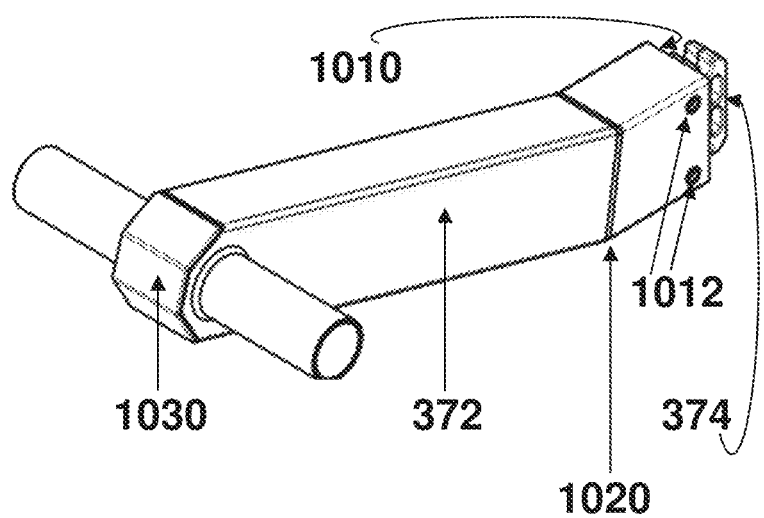
Figure 10D:
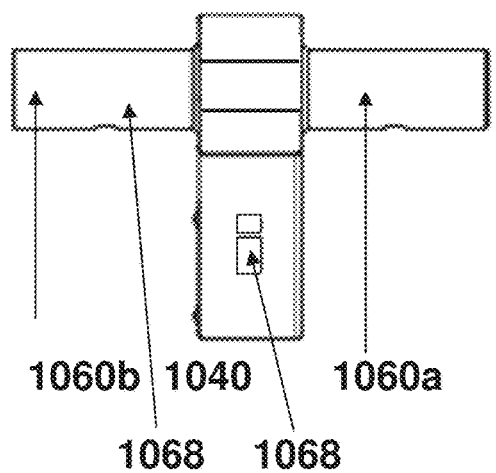
Figure 10E:
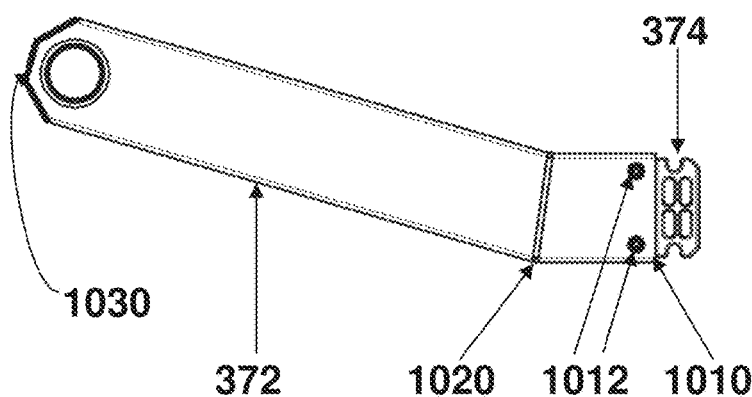
Figure 10F:
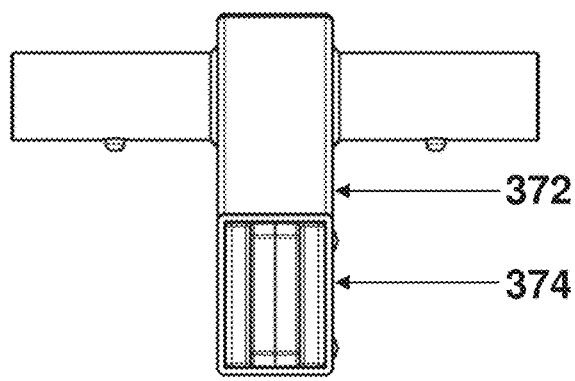
Figure 11A:
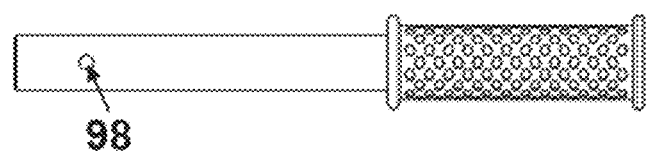
Figure 11B:
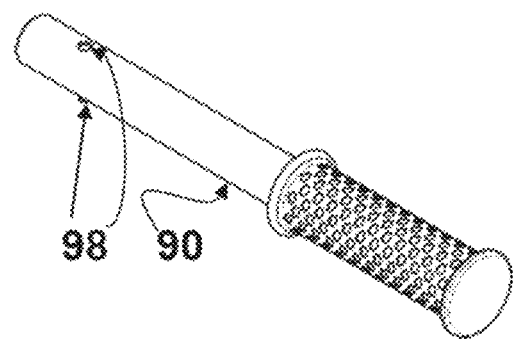
Figure 11C:
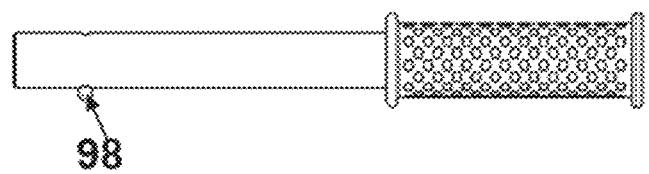
Figure 11D:
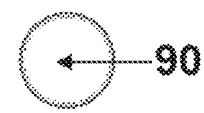
Figure 12A:
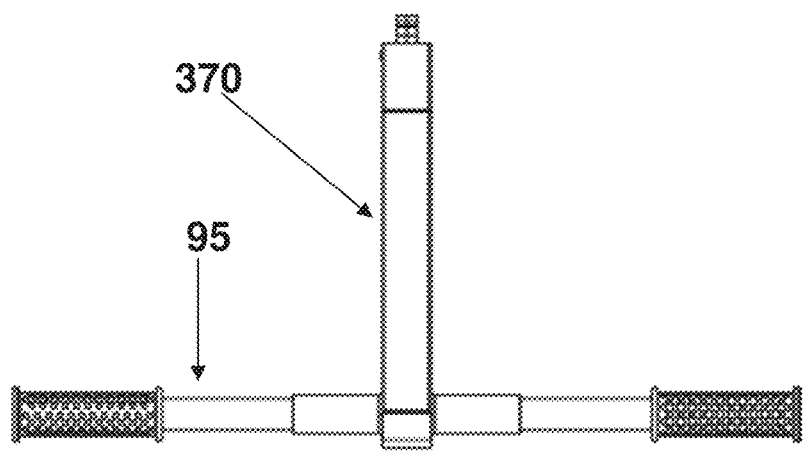
Figure 12B:
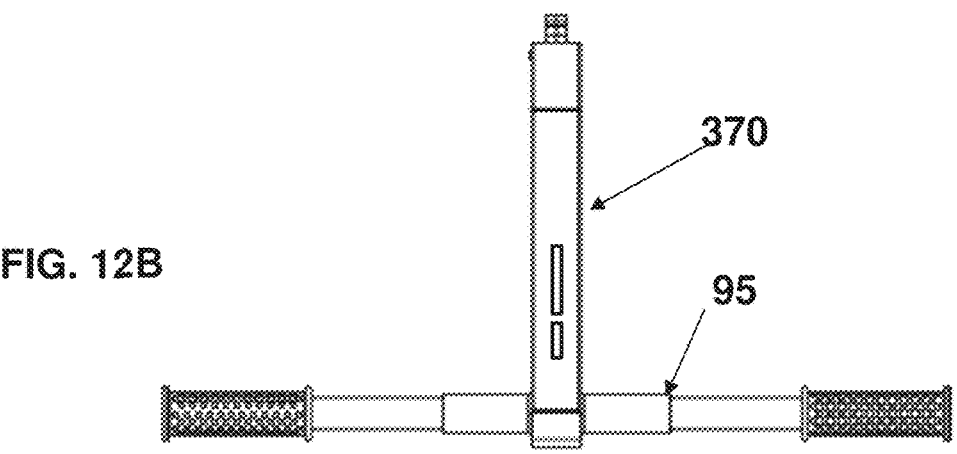
Figure 12C:
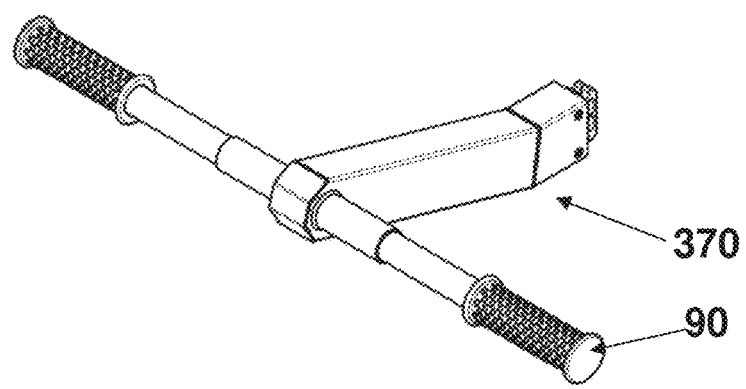
Figure 12D:
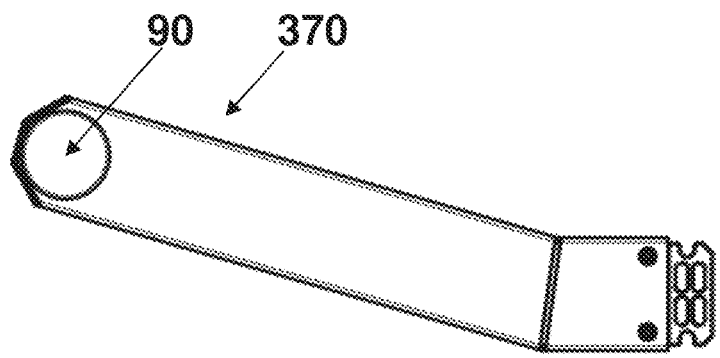
Figure 12E:
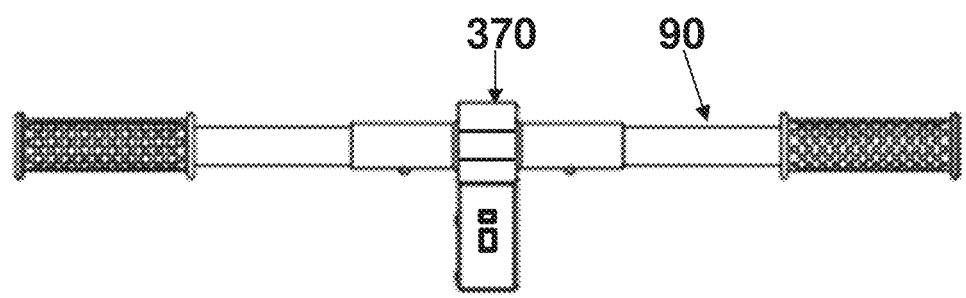
Figure 12F:
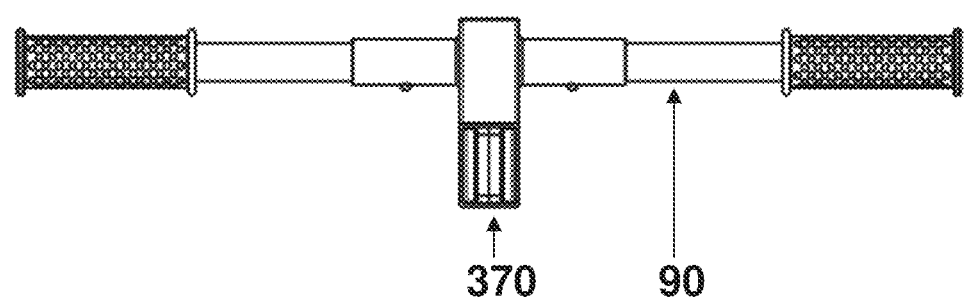

Alternatively, the free end 1030 may have retractable spring buttons (not shown) on its outside surface and arranged to click into holes in a rod on the equipment accessory into which the free end is arranged to fit. Alternatively, the free end 1030 may have an attachment element (not shown), such as the element 345, to which equipment accessories may be attached, or the free end 1030 may have a releasable connection element such as elements 320, 380 for connection to a complementary element on an equipment accessory. Another attachment element that may be available on the free end 1030 is shown in FIGS. 10B, 10D, 10F on the bottom surface of the frame extender bracket, namely an elongated recess 1040 with a bar 1042 extending thereacross around which a carabiner may be attached.

Releasable connection between the free end 1030 and the equipment accessory may be suitable when it is desirable to position an equipment accessory away from the wall, but when use of the equipment accessory would not exert extreme pressures on the anchor unit 310 for example by use of an equipment accessory such as a small punching bag. It is to be understood that the number and location of the connection sites on the free end 1030 may be left to the discretion of the system designer.

In other embodiments, the frame extender 372 may be permanently attachable to an equipment accessory. The embodiment shown in FIGS. 10A-12F shows the extended frame type fitting bracket 370 as a type of extender bracket to which a piece of equipment may be permanently attached to the bracket 370. In the embodiment shown in FIGS. 10A-10F, the embodiment of the bracket 370 is intended to carry a pull up bar 95, which may be permanently welded or riveted to the frame extender 372 at its end 1030.

As shown in FIGS. 10A-10F, support sleeves 1060a, 1060b of a pull-up bar 95 are secured to and extend perpendicularly away from the free end 1030 of the frame extender 372 and parallel to the floor.

The handles 90 of the pull-up bar, shown in FIGS. 11A-11D, may be conventional stock items having rubbery grips 92 and bars 94 that can click into the support sleeves 1060a, 1060b secured to the frame extender 372. The support sleeves 1060a, 1060b attached to the free end 1030 of the frame extender 372 are sized to snugly receive conventional handles 90 so that a pull-up bar 95 may be created on the end 1030 of the frame extender 372. Further, the support sleeves 1060a, 1060b may have connection sites 1068 that are complementary to connection sites 98 on the handle 90, and may be used to provide a more secure attachment between the handles 90 and the support sleeves 1060a.

For embodiments in which the support sleeves 1060a, 1060b are permanently releasably attachable to the equipment accessory, the connection sites 1068 may operate as welding sites for sites at which the handle may be permanently welded to the support sleeves 1060a, 1060b. Alternatively, for embodiments in which the support sleeves 1060a, 1060b are releasably attachable to the equipment accessory, the connection sites 1068 may have conventional releasable attachment components that may be operated to releasably secure an equipment accessory to the free end 1030. For example, the connection sites 1068 may have apertures that are sized and arranged to receive retractable spring buttons on the connection sites 98 to releasably secure the handles 90 to the support sleeves 1060a, 1060b.

The fully assembled extended frame type fitting bracket 370, with a pull-up bar securely attached thereto, is shown in FIGS. 12A-12F. The bracket 370 may then be secured by a U-pin 350 to the mounting base 320 to form a frame extender anchor unit 360.

The universal equipment mounting system 300 described here illustrates a system in which a fitting bracket of a selected securing type may be releasably attached to a mounting base of a selected mounting type to provide a system that is securable to a surface such as a wall and is arranged to receive and securely hold several types of medical, fitness, or exercise equipment thereon. In some embodiments, as disclosed above,

- the fitting bracket may be of a single securing type that may be releasably attached to a mounting base of a single mounting type,
- the fitting bracket may be one of a plurality of securing types that may be releasably attached to a mounting base of a single mounting type,
- the fitting bracket may be of a single securing type that may be releasably attached to a mounting base having one of a plurality of mounting types, or
- the fitting bracket may be one of a plurality of securing types that may be releasably attached to a mounting base having one of a plurality of mounting types.

In other embodiments, one or more fitting brackets may be releasably securable to one or more mounting bases at the same time. For example,

- a single fitting bracket may be releasably and simultaneously secured at its attachment end to two or more mounting units to increase integral structure and strength of the releasable joinder of the fitting bracket to the wall;
- two or more fitting brackets may be connected together at their attachment ends to a single mounting unit to create a new piece of exercise equipment; or
- the new piece of exercise equipment formed from two fitting brackets connected together at their attachment ends may be connected at their attachment ends to two or more mounting units at the same time to increase integral structure and strength of the releasable joinder of the fitting bracket to the wall.

Figure 13:
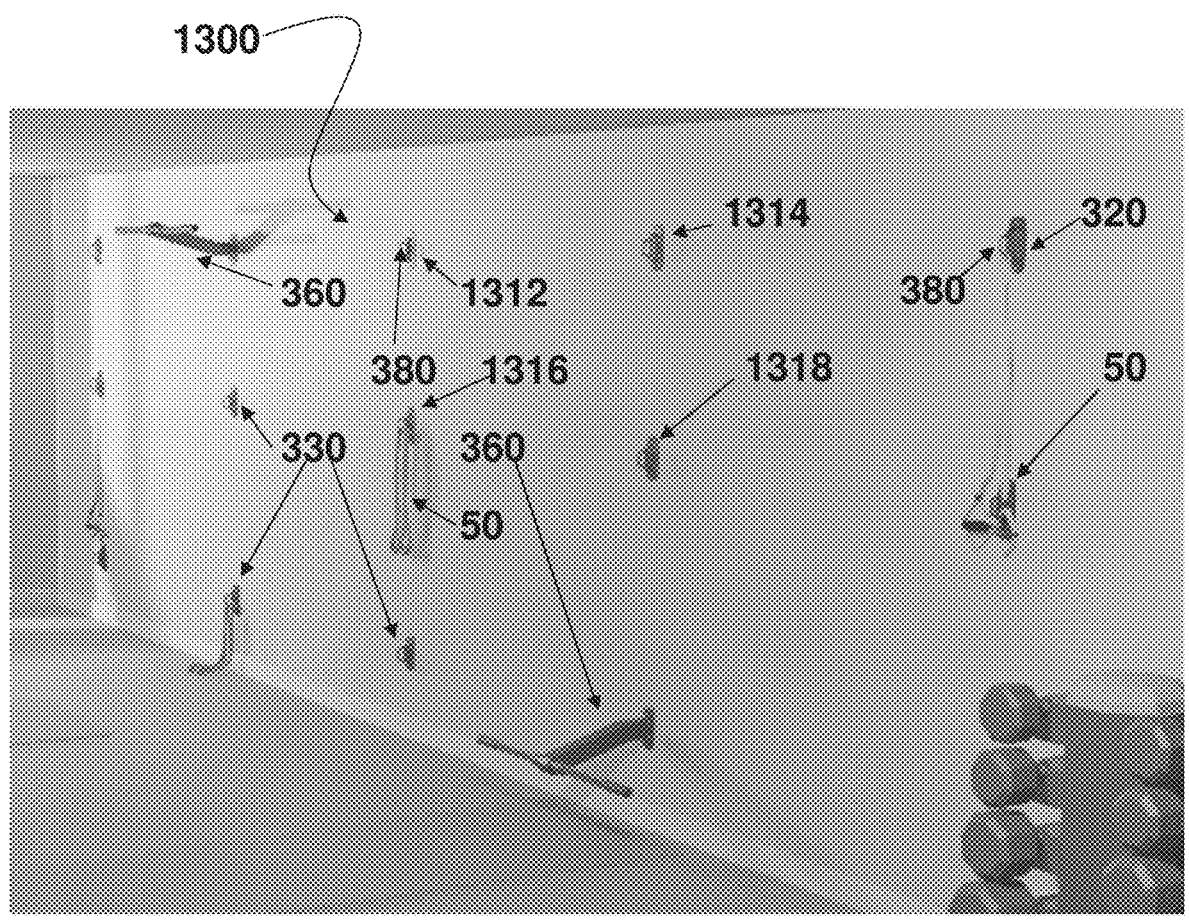
FIG. 13 is a front perspective view of a health, medical, fitness, and exercise equipment mounting system 300 with a plurality of anchor units 310 installed on the wall of a gym.

A universal equipment mounting system such as disclosed herein may have a mounting base system with two, three or six mounting bases fixed to a wall vertically, horizontally, diagonally, or in any selected group, to which may be connected the plurality of fitting brackets. For example, FIG. 13 illustrates the universal equipment mounting system 1300 with a plurality of anchor units 310 mounted to the wall of a gym. FIG. 13 shows the system 1300 with a plurality of the assembled short frame anchor units 330 and a plurality of the assembled frame extender anchor units 360 attached to the wall.

While the mounting units 310 in the system 1300 may be disposed on the wall in any arrangement, as shown in FIG. 13, mounting bases 1312, 1314, 1316, 1318 may be disposed on the wall in a grid vertically and horizontally; and a single fitting bracket 380 alone or in combination with other fitting brackets may be releasably secured to one or more of the mounting bases 1310, 1320, 1330, 1340, in any desired combination, vertically, horizontally, diagonally or in any selected group.

In an alternative embodiment, medical, fitness, and exercise equipment mounting systems may have at least one anchor unit is attachable to a stringer board that is mounted to the surface at the one or more wall studs. For example, systems 1400*a*, 1400*b*, shown in FIGS. 14A, 14B, respectively, may have mounting bases 1412, 1414, 1416, 1418 disposed on stringer boards 1405*a*, 1405*b*, respectively, mounted to the wall at one or more of its wall studs to provide additional security to the attachment of the bases to the wall. A stringer board (also known as a stringer) is a board which may be secured (such as screwed) into wall studs. Stringers are frequently used in home construction to provide more support, strength, or structural integrity to elements attached to the wall, such as stairs, bathtub, or medical, fitness, and exercise equipment.

Figure 14A:
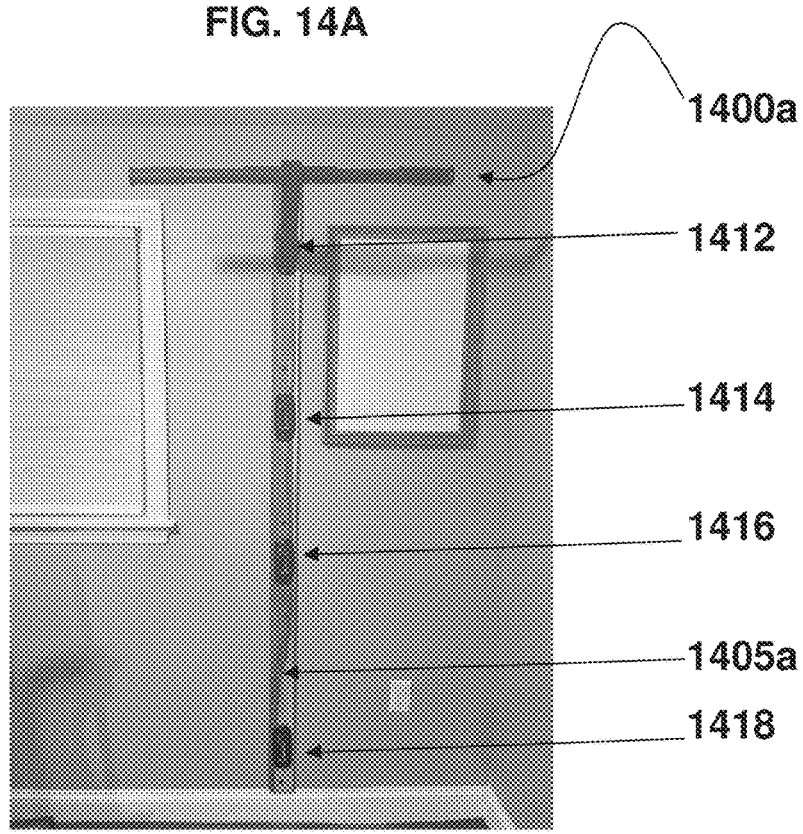

In FIG. 14A, which shows the medical, fitness, and exercise equipment mounting system 1400*a*, a stringer board 1405*a* may be disposed vertically to the wall, with the wall having one or more wall studs and the stringer screwed in multiple locations along a single stud; and the mounting bases then may be secured to the stringer board. A variety of fitting brackets may be secured to the mounting base, and a variety of pieces of exercise equipment may be secured to the anchor units so formed.

Figure 14B:

In FIG. 14B, which shows the medical, fitness, and exercise equipment mounting system 1400*b*, a stringer board 1405*b* may be disposed horizontally to the wall across two or more studs, with the stringer screwed onto at least two studs. The stringer may also be screwed in multiple locations on the multiple studs. As with system 1400*b*, a variety of fitting brackets may be secured to the mounting base, and a variety of pieces of exercise equipment may be secured to the anchor units so formed.

It may be seen that secure, releasable attachment of equipment accessories to a stable anchor unit provides a solid and effective way to do various exercises with a moving body. The system herein described allows a user to user to select a piece of medical, fitness, or exercise equipment, secure it to a surface-mounted base that is common to a plurality of types of medical, fitness, or exercise equipment, and after, using the selected equipment for one type of activity, to release the selected equipment and secure another piece of equipment to the surface-mounted base for use in performing another type of activity or to move to another station to use another piece of equipment.

The system further allows a user to securely attach a common base to a surface such as a wall so that multiple types of medical, fitness and exercise equipment may be releasably and securely attached to the surface via the base. Still further, a user is able to have a plurality of options as to a height at which to secure the mounting base on the surface.

The system further allows apparatus portability that is not provided by any other equipment mounting systems. For example, in the equipment mounting system of the current invention, a single bracket may be releasably secured to mounting units in multiple locations, and multiple brackets may be releasably secured to a mounting unit at a single location. Further, in conventional systems, a user would have to purchase a whole new equipment mounting system for each desired mounting location.

Further, the permanently bolted exercise equipment that is currently used to secure equipment to the wall, ceiling, floor and other surfaces may be replaced by the equipment mounting system of herein described for extreme versatility, functionality, and portability. Further, the system herein disclosed has a less commercialized look and a less invasive option that is well suited for more locations such as home, outdoor, ceiling, and small spaces, providing more versatility to where the disclosed system can be installed.

Although the disclosed components have been described above as being separate units, one of ordinary skill in the art will recognize that functionalities provided by one or more units may be combined. As one of ordinary skill in the art will appreciate, one or more units may be optional and may be omitted from implementations in certain embodiments. For example, while the frame extender anchor unit 360 is shown as featuring with a handle 90 to form a hanging bar, it may be understood that any equipment accessory may be attached to the frame extender anchor unit.

At the option of the system designer, the frame extender anchor unit 360 may be equipped with an equipment accessory attachment element such as elements 235, 345 to which equipment accessories may be attached to support the use of any equipment accessory that would be convenient to be used spaced from the wall. Thus, the frame extender anchor unit 360 may be modified to support the use of punching bags, gymnastic rings, or any other equipment accessory for which additional space from the wall is desired. At the election of the designer or the customer (based on his or her budget), a health, medical, fitness, and exercise equipment mounting system of the current invention may feature a plurality of frame extender anchor units 360 (one with a pull-up bar, one for every other piece of equipment for which additional space from the wall is desired, and/or one with an equipment accessory attachment element to which such pieces of equipment may be releasably attached.

Further, one of ordinary skill in the art will recognize that features described herein may be implemented in manners not described herein. For example, one or more mounting bases may be secured to a panel, which in turn may be secured to a wall or other structures such as poles. Further, while mounting units are described herein as being secured to a surface with fastening items such as lag bolts, in certain embodiments, the mounting units may attach to other surfaces without resort to lag bolts. For example, in order to provide the universal equipment mounting system with portability, a mounting unit may be arranged to couple to a connection system such as a conventional ratchet strap system (not shown).

The Thule Multipurpose Locking Straps system, available from Thule Group AB of Malmö, Sweden and the Tensys Ratchet Lashing System, available from Arinsdale Ltd, of Grangemouth, Scotland, UK are examples of suitable conventional ratcheting systems, in which a strap, which may be made of heavy duty polyester webbing, may be positioned around the circumference of a load and tightened by hand operation of a ratchet tensioner, which has a toothed bar and a pawl adapted to engage with the teeth of the bar so as to prevent movement or to impart motion.

In applying a ratcheting system to the equipment mounting system disclosed herein, in referring to FIGS. 4A-4E, a piece 410 of the mounting unit 320 may be modified to have parallel slots along each vertical side of the piece 410 (for example parallel to the line segment defined by the pin holes 422 on one side of the box 420), with the slots sized to receive a latching system strap. The strap may be wrapped around the circumference of an item, and each end of the strap may be fed into a ratchet tensioner. Movement of the pawl against the toothed bar causes the strap to tighten on one side against the item around which it is wrapped until the strap and the mounting unit are secured against the item. Thus, the mounting base may be used in locations other than walls. It may be permanently or temporarily fixed to any convenient location using any suitable fastening system.

Accordingly, the exercise equipment mounting system may be used on an interior or exterior wall or platform, on any interior or exterior post or pole, on a tree, a door frame provided with an aperture, or on stations in an exercise court. It may be used for the attachment of recreational equipment such as soccer net, basketball hoop, volleyball nets, or an anchor to attach exercise accessories.

In certain embodiments, the exercise equipment mounting system may be part of a free-standing unit, such as a conventional free standing squat rack having more than one mounting base to which multiple fitting brackets may be releasably securable to one or more of the mounting bases. In other embodiments, the exercise equipment mounting system may be part of a free standing mounting unit which may one or a plurality of mounting bases for attachment of equipment accessories thereto, and which may be connected together to form a traditional fitness station.

The foregoing descriptions have been presented for purposes of illustration. It is not exhaustive and does not limit the invention to the precise forms or embodiments disclosed.

For example, as noted above, while the above description addresses methods and systems for storing and secure, releasable mounting of health, medical, fitness, and exercise equipment, it is to be understood that such systems and methods are not limited to storing and mounting such equipment, and may be useful in managing any systems with multiple items, in particular any systems of modular items. They may be useful in any environment in which items or other equipment, such as craft supplies or tools, are shared, particularly in factories, theaters, gyms, hospitals, and craft or framing centers.

Further, the mounting bases described herein may be provided with electrical wiring, and the mounting bases and fitting brackets may be provided with electrical connections so that a selected mounting base plugged into an outlet may be electrically connected with a selected fitting bracket, which in turn may be electrically connected with a selected item secured to the fitting bracket to provide power to the item. Further, the mounting bases or fitting brackets may be provided with lighting or sound equipment to enhance the functionality of the system or to increase the flexibility of using the system.

Modifications and adaptations of the invention will be apparent to those skilled in the art from consideration of the specification and practice of the disclosed embodiments. It is intended that the specification and examples be considered as exemplary only, with a true scope and spirit of the invention being indicated by the following claims.

The invention claimed is:

1. An item mounting system comprising:
a plurality of anchor units securely attachable directly or indirectly to a surface, wherein a first anchor unit has:
a mounting base that is securely attachable directly or indirectly to the surface, and a fitting bracket:
having at one end a mounting base attachment fixture securely but releasably attachable to the mounting base,
having at another end an item attachment fixture that is attachable to one or more items in a set of items, and
arranged to fit tightly within the mounting base through an aperture in a front surface of the mounting base;
a securing subsystem arranged to secure the mounting base to the surface; and
an attachment subsystem arranged to releasably, tightly, and securely attach the mounting base to the fitting bracket
wherein the fitting bracket and the mounting base are generally planar, the fitting bracket arranged to be disposed orthogonally within the mounting base, with the fitting bracket being disposed within the interior of the mounting base along the length of the mounting base to form an assembled anchor unit;
wherein a mounting base-facing surface of the fitting bracket and a fitting bracket-facing surface of the mounting base are arranged to form a pair of open conduits extending across the assembled anchor unit when the fitting bracket is disposed within the mounting base, the conduits extending across a width of the fitting bracket when the fitting bracket is fit into the mounting base; and
wherein a fitting attachment subsystem further comprises the pair of open conduits and a locking U-pin arranged to extend across the assembled mounting base through the pair of open conduits;
wherein the open conduits are defined by:
a first open channel disposed along a width of an upper portion of a mounting base-facing surface of the fitting bracket and a second open channel disposed horizontally along a width of a bottom portion of the mounting base-facing surface of the fitting bracket, the first and second open channels sized and arranged to allow legs of the locking U-pin to extend thereacross; and
a first pair of mounting base pin holes disposed on a first side of the mounting base and a second pair of mounting base pin holes disposed on a second side of the mounting base, the first and second pairs of mounting base pin holes arranged in size and location to serve as entries to and exits from the open conduits and to receive the legs of the locking U-pin so that the locking U-pin is extendable through the assembled anchor unit.

2. The item mounting system of claim 1, wherein the anchor units are arranged to allow a selected item to be attachable releasably and simultaneously to more than one anchor unit.

3. The item mounting system of claim 1, wherein the plurality of anchor units further comprise a plurality of mounting bases in a set of mounting bases, a plurality of fitting brackets in a set of fitting brackets, and a plurality of item attachment types associated with the set of fitting brackets, with a selected item attachment type comprising a selected type of fitting bracket from which at least one of multiple items may be releasably and securely attached to the surface,
wherein a first fitting bracket has a first item attachment type associated therewith, the to secure the fitting brackets to the mounting base, and a second fitting bracket has a second item attachment type associated therewith,
wherein the first item attachment type is different from the second item attachment type, and
wherein at least one of the mounting bases is releasably and securely attachable to at least one of the fitting brackets in the set of fitting brackets.

4. The equipment mounting system of claim 3, further comprising the plurality of mounting bases being in a set of mounting bases and a plurality of mount-securing types associated with the plurality of mounting bases, with a selected mount-securing type comprising a selected type of mounting base from which at least one of multiple fitting brackets may be releasably and securely attached to a selected mounting base,
  wherein a first mounting base has a first mount-securing type associated therewith, and a second mounting base has a second mount-securing type associated therewith,
  wherein the first mount-securing type is different from the second mount-securing type, and
  wherein at least one of the fitting brackets in the set of fitting brackets is releasably and securably attachable to at least one of the mounting bases in the set of mounting bases.

5. The item mounting system of claim 1, further comprising a plurality of mounting bases in a set of mounting bases and a plurality of mount-securing types associated with the plurality of mounting bases, with a selected mount-securing type comprising a selected type of mounting base from which at least one of multiple fitting brackets may be releasably and securely attached to a selected mounting base,
  wherein a first mounting base has a first mount-securing type associated therewith, and a second mounting base has a second mount-securing type associated therewith,
  wherein the first mount-securing type is different from the second of mount-securing type, and
  wherein at least one of the fitting brackets in a set of fitting brackets is releasably and securably attachable to at least one of the mounting bases in the set of mounting bases.

6. The item mounting system of claim 1,
  wherein the surface has one or more wall studs; and
  wherein at least one anchor unit is attachable to a stringer board that is mounted to the surface at the one or more wall studs.

7. A method, comprising:
  a mounting base that is securely attachable directly or indirectly to a surface, and
  a fitting bracket,
    having at one end a mounting base attachment fixture securely but releasably attachable to the mounting base, and having at another end an item attachment fixture that is attachable to one or more items in a set of items, and
    arranged to tightly fit within the mounting base through an aperture in a front surface of the mounting base;
  a securing subsystem arranged to secure the mounting base to the surface; and
  an attachment subsystem arranged to releasably, tightly, and securably attach the mounting base to the fitting bracket;
    wherein the fitting bracket and the mounting base are generally planar, the fitting bracket arranged to be disposed orthogonally within the mounting base, with the fitting bracket being disposed within the interior of the mounting base along the length of the mounting base to form an assembled anchor unit;
  wherein amounting base-facing surface of the fitting bracket and a fitting bracket-facing surface of the mounting base are arranged to form a pair of open conduits extending across the assembled anchor unit when the fitting bracket is disposed within the mounting base, the conduits extending across a width of the fitting bracket when the fitting bracket is fit into the mounting base; and
  wherein a fitting attachment subsystem further comprises the pair of open conduits and a locking U-pin arranged to extend across the assembled mounting base through the pair of open conduits;
  wherein the open conduits are defined by:
    a first open channel disposed along a width of an upper portion of a mounting base-facing surface of the fitting bracket and a second open channel disposed horizontally along a width of a bottom portion of the mounting base-facing surface of the fitting bracket, the first and second open channels sized and arranged to allow legs of the locking U-pin to extend thereacross; and
    a first pair of mounting base pin holes disposed on a first side of the mounting base and a second pair of mounting base pin holes disposed on a second side of the mounting base, the first and second pairs of mounting base pin holes arranged in size and location to serve as entries to and exits from the open conduits and to receive the legs of the locking U-pin so that the locking U-pin is extendable through the assembled anchor unit;
  securely attaching the mounting base of the anchor unit directly or indirectly to the surface;
  releasably securing the fitting bracket to the mounting base, by:
    tightly inserting the mounting base to the attachment fixture disposed on one end of the fitting bracket into the aperture in the mounting base to form an installed fitting bracket/mounting base, and
    releasably, tightly, and securably attaching the mounting base to the fitting bracket with a releasable connector; and
  attaching one or more items in a set of items to an item attachment fixture disposed on another end of the fitting bracket.

8. The method of claim 7, further comprising disposing the releasable connector generally parallel to the surface and orthogonal to the floor along a length of the installed fitting bracket/mounting base.

9. The method of claim 7, further comprising disposing the releasable connector generally parallel to the floor and to the surface along a width of the installed fitting bracket/mounting base.

10. The method of claim 7, wherein securely attaching the mounting base attachment fixture to the mounting base further comprises:
  disposing a first pair of pin holes on a first vertical side of the mounting base and a second pair of pin holes on a second vertical side of the mounting base,
    wherein the first vertical side is parallel to the second vertical side, and
    wherein the first pair of pin holes is arranged to be complementary in size and location to the second pair of pin holes;
  disposing a first open channel horizontally along a width of an upper portion of a mounting base-facing surface of the fitting bracket and disposing a second open channel horizontally along a width of a lower portion of the mounting base-facing surface of the fitting bracket, with the first open channel parallel to the second open channel;
  wherein the installing the fitting bracket to the mounting base further comprises forming parallel open conduits in the installed fitting bracket/mounting base,
    with the open conduits extending horizontally along the width of the mounting base and parallel to the floor, with sides of the open conduits defined by the first open channel, the second open channel, and horizontal open channels in the fitting bracket-facing surface of the mounting base, and with openings of the conduits defined by the first set of pin holes and the second set of pin holes; and passing legs of a locking U-pin through the conduits.

11. An anchor unit comprising:

a mounting base that is securely attachable directly or indirectly to a surface, and a fitting bracket, having at one end a mounting base attachment fixture securely but releasably attachable to the mounting base, and having at another end an item attachment fixture that is attachable to one or more items in a set of items, and arranged to tightly fit within the mounting base through an aperture in a front surface of the mounting base;

a securing subsystem arranged to secure the mounting base to the surface; and an attachment subsystem arranged to releasably, tightly, and securably attach the mounting base to the fitting bracket;

wherein the fitting bracket and the mounting base are generally planar, the fitting bracket arranged to be disposed orthogonally within the mounting base, with the fitting bracket being disposed within the interior of the mounting base along the length of the mounting base to form an assembled anchor unit;

wherein amounting base-facing surface of the fitting bracket and a fitting bracket-facing surface of the mounting base are arranged to form a pair of open conduits extending across the assembled anchor unit when the fitting bracket is disposed within the mounting base, the conduits extending across a width of the fitting bracket when the fitting bracket is fit into the mounting base; and wherein a fitting attachment subsystem further comprises the pair of open conduits and a locking U-pin arranged to extend across the assembled mounting base through the pair of open conduits;

wherein the open conduits are defined by:

a first open channel disposed along a width of an upper portion of a mounting base-facing surface of the fitting bracket and a second open channel disposed horizontally along a width of a bottom portion of the mounting base-facing surface of the fitting bracket, the first and second open channels sized and arranged to allow the legs of the locking U-pin to extend thereacross; and a first pair of mounting base pin holes disposed on a first side of the mounting base and a second pair of mounting base pin holes disposed on a second side of the mounting base, the first and second pairs of mounting base pin holes arranged in size and location to serve as entries to and exits from the open conduits and to receive the legs of the locking U-pin so that the locking U-pin is extendable through the assembled anchor unit.

12. The anchor unit of claim 11, wherein the attachment subsystem further comprises a releasable connector that is disposed horizontally along the width of the mounting base and parallel to the floor.

13. The anchor unit of claim 11, wherein the attachment subsystem further comprises a releasable connector that is disposed vertically along the length of the mounting base and orthogonal to the floor.

14. The anchor unit of claim 11, wherein the item attachment fixture is permanently attachable to a selected item.

15. The anchor unit of claim 11, wherein the item attachment fixture is releasably attachable to a selected item.

16. The anchor unit of claim 11, wherein the item attachment fixture is arranged to attach simultaneously to more than one item.

17. The anchor unit of claim 11, wherein the locking U-pin has generally parallel legs integral with a central rod that extends generally perpendicularly between the locking U-pin legs, the U-pin legs formed with a cross sectional diameter, and formed of a material selected to impart a strength to the locking U-pin that is sufficient to allow the assembled anchor unit to remain locked and to withstand pressures exerted thereon during use of a selected item when the selected item is releasably attached to the fitting bracket of the assembled anchor unit.

18. The anchor unit of claim 11, wherein the open conduits are defined by the first open channel, the second open channel, and horizontal open channels in the fitting bracket-facing surface of the mounting base, and wherein the openings of the conduits are defined by the first set of pin holes and the second set of pin holes.

19. The anchor unit of claim 11, wherein the fitting bracket-facing surface of the mounting base has ribs positioned thereon horizontally disposed thereon and arranged to cover and close the pair of open channels on the fitting bracket into generally ring-shaped conduits that are sized to guide the locking U-pin therethrough when the fitting bracket is inserted into the mounting base.

* * * * *